United States Patent
Yamada

(10) Patent No.: US 12,035,078 B2
(45) Date of Patent: Jul. 9, 2024

(54) LIGHT SOURCE DEVICE AND PROJECTOR

(71) Applicant: SEIKO EPSON CORPORATION, Tokyo (JP)

(72) Inventor: Fumika Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/706,763

(22) Filed: Mar. 29, 2022

(65) Prior Publication Data
US 2022/0311978 A1    Sep. 29, 2022

(30) Foreign Application Priority Data
Mar. 29, 2021  (JP) .................. 2021-054823

(51) Int. Cl.
*H04N 9/31* (2006.01)
*G03B 21/20* (2006.01)

(52) U.S. Cl.
CPC ......... *H04N 9/3152* (2013.01); *G03B 21/204* (2013.01)

(58) Field of Classification Search
CPC .. H04N 9/3152; H04N 9/3105; H04N 9/3158; H04N 9/3161; H04N 9/3164; G03B 21/204
See application file for complete search history.

(56) References Cited

U.S. PATENT DOCUMENTS

| | | |
|---|---|---|
| 9,972,755 B2 | 5/2018 | De Boer et al. |
| 10,663,121 B2 | 5/2020 | Kobayashi et al. |
| 10,732,328 B2 | 8/2020 | Murai et al. |
| 2016/0161644 A1* | 6/2016 | Verschuuren .......... G02B 5/008 359/241 |

(Continued)

FOREIGN PATENT DOCUMENTS

| | | | |
|---|---|---|---|
| CN | 112349744 A * | 2/2021 | ............ H01L 23/66 |
| JP | 5317288 B | 10/2013 | |

(Continued)

OTHER PUBLICATIONS

English Translation of JP-2019176105-A; Light emitting device; Akabane; (Year: 2019).*

(Continued)

*Primary Examiner* — Zheng Song
*Assistant Examiner* — Glenn D. Zimmerman
(74) *Attorney, Agent, or Firm* — Dority & Manning, P.A.

(57) ABSTRACT

A light source device includes a light source configured to emit excitation light, a phosphor which the excitation light enters, the phosphor being configured to emit fluorescence different in wavelength from the excitation light, a plurality of first nanoantennas provided to the phosphor, and a plurality of second nanoantennas provided to the phosphor. Each of the first nanoantennas is formed of metal. Each of the second nanoantennas is formed of a material higher in melting point than the metal. An arrangement area of the plurality of second nanoantennas overlaps an irradiation area (Continued)

with the excitation light in a plan view viewed from a normal direction of the phosphor. An electric field enhancement of the fluorescence is achieved by each of the first nanoantennas and each of the second nanoantennas.

21 Claims, 16 Drawing Sheets

(56) References Cited

U.S. PATENT DOCUMENTS

| | | | |
|---|---|---|---|
| 2017/0309797 | A1 | 10/2017 | De Boer et al. |
| 2018/0024279 | A1* | 1/2018 | Murai .................. F21V 9/30 362/84 |
| 2019/0072245 | A1 | 3/2019 | Kobayashi et al. |
| 2020/0033536 | A1* | 1/2020 | Suzuki ................ G03B 21/204 |
| 2020/0203585 | A1* | 6/2020 | Lopez-Julia ............ H01L 33/60 |
| 2021/0033756 | A1* | 2/2021 | Matsuki ................ H01S 5/0087 |

FOREIGN PATENT DOCUMENTS

| | | | |
|---|---|---|---|
| JP | 2017-505516 | A | 2/2017 |
| JP | 2017-157488 | A | 9/2017 |
| JP | 2018-013688 | A | 1/2018 |
| JP | 2019176105 | A * | 10/2019 |
| WO | WO2013-103039 | A | 5/2015 |
| WO | WO-2016208644 | A1 * | 12/2016 |
| WO | WO2017-169628 | A | 10/2017 |
| WO | WO-2019143295 | A1 * | 7/2019 |

OTHER PUBLICATIONS

English Translation of WO-2016208644-A1; Optical Device, Light Source Device and Projection Device; Imada; (Year: 2016).*

* cited by examiner

LIGHT SOURCE DEVICE AND PROJECTOR

The present application is based on, and claims priority from JP Application Serial Number 2021-054823, filed Mar. 29, 2021, the disclosure of which is hereby incorporated by reference herein in its entirety.

BACKGROUND

1. Technical Field

The present disclosure relates to a light source device and a projector.

2. Related Art

In recent years, as a light source for projectors, there is used a solid-state light source such as a laser having excellent features such as mercury-free, high-luminance, and long-life instead of a mercury light source which has been the mainstream in the past. For example, in JP-A-2018-013688 (Document 1), there is disclosed an optical device having a wavelength conversion body and an antenna array. The wavelength conversion body has a plane of incidence and an exit surface, converts a wavelength of incident light which enters the wavelength conversion body from the plane of incidence to generate wavelength-converted light, and then emits the wavelength-converted light from the exit surface. The antenna array has a plurality of antennas which are formed on the wavelength conversion body, and are arranged at a pitch around an optical wavelength of the wavelength-converted light in the wavelength conversion body.

Each of the antennas of the optical device disclosed in Document 1 is formed of a material having a plasma in a visible wavelength band such as gold (Au), or an alloy or a stacked body including such a material. However, when the wavelength-converted light is emitted, a phosphor plate of the wavelength conversion body (a wavelength conversion device) generates heat to cause a problem such as melting or breakage of a material of the antennas. When the melting or the breakage of the material of the antennas occurs, there is a possibility that the wavelength-converted light is emitted in a direction different from a direction in which the wavelength-converted light should originally be emitted to cause a deterioration of the performance of the light source device and a display device.

SUMMARY

In view of the problems described above, a light source device according to an aspect of the present disclosure includes a light source configured to emit excitation light, a phosphor which the excitation light enters, the phosphor being configured to emit fluorescence different in wavelength from the excitation light, a plurality of first nanoantennas provided to the phosphor, and a plurality of second nanoantennas provided to the phosphor. Each of the first nanoantennas is formed of metal. Each of the second nanoantennas is formed of a material higher in melting point than the metal. An arrangement area of the plurality of second nanoantennas overlaps an irradiation area with the excitation light in a plan view viewed from a normal direction of the phosphor. An electric field enhancement of the fluorescence is achieved by each of the first nanoantennas and each of the second nanoantennas.

DESCRIPTION OF EXEMPLARY EMBODIMENTS

First Embodiment

A first embodiment of the present disclosure will hereinafter be described using FIG. 1 through FIG. 9.

Figure 1:
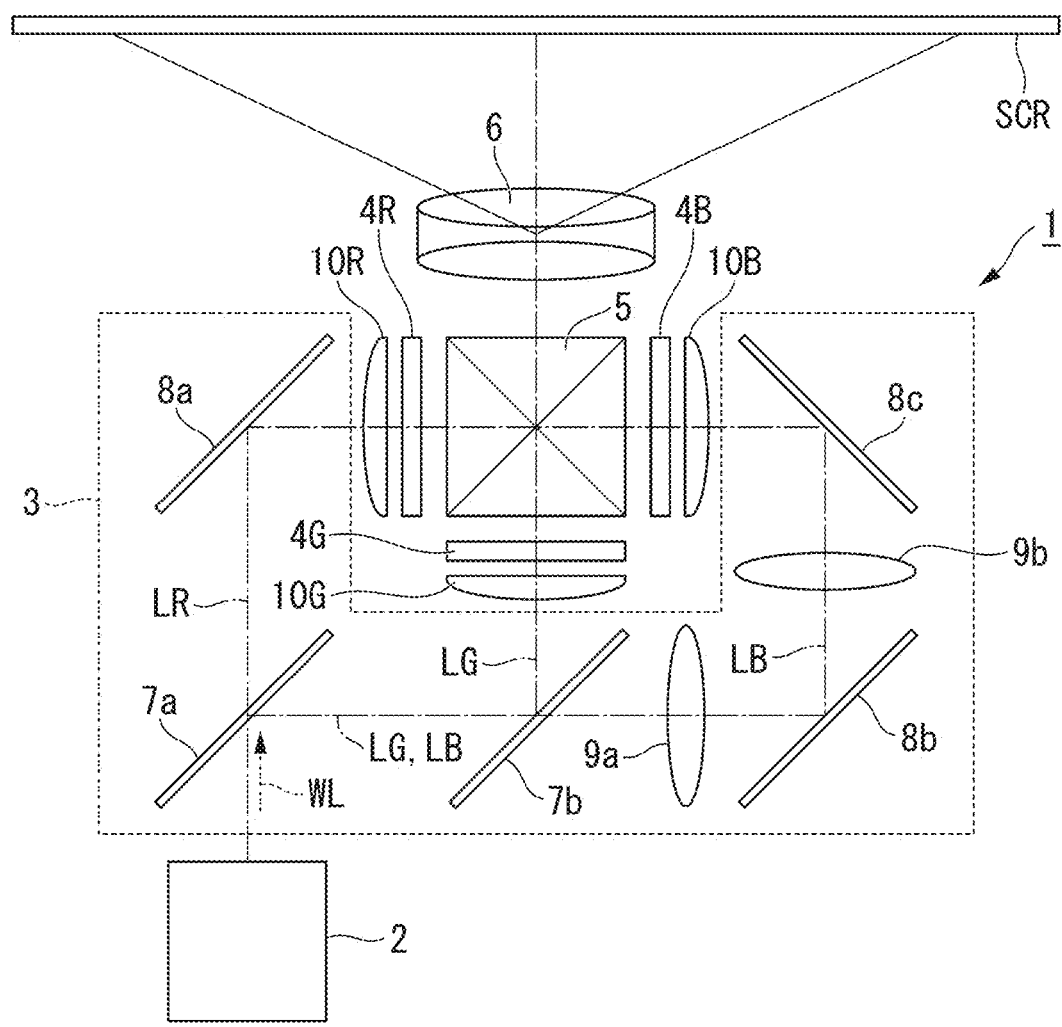
FIG. 1 is a schematic configuration diagram of a projector according to a first embodiment.
Figure 2:
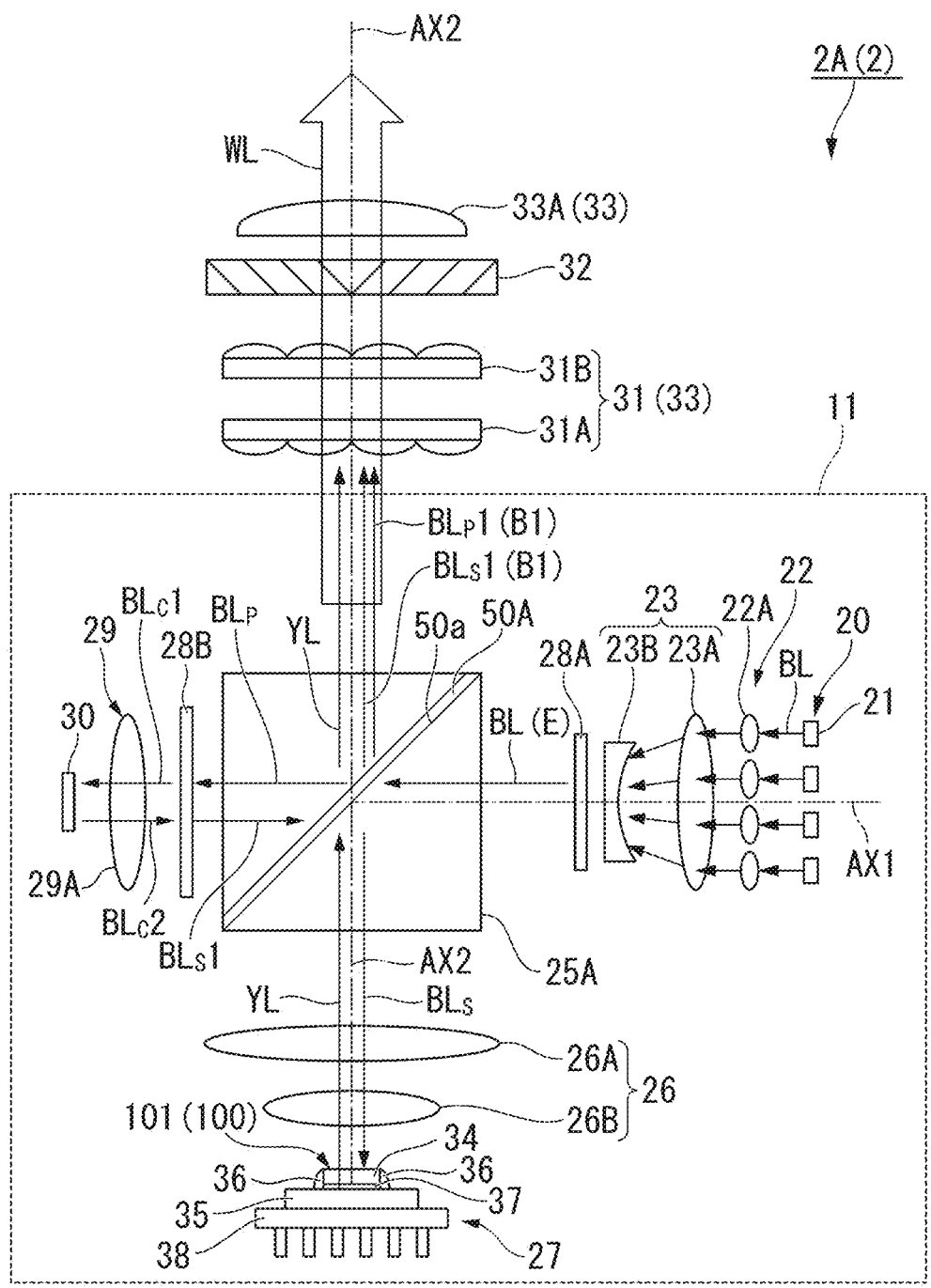
FIG. 2 is a schematic configuration diagram of an illumination device provided to the projector shown in FIG. 1.

FIG. 1 is a schematic configuration diagram showing a projector 1 according to the first embodiment. FIG. 2 is a side view of an illumination device 2 provided to the projector 1.

In the drawings described below, in order to make constituents eye-friendly, the scale ratio of the size is made different by the constituents in some cases.

The projector according to the present embodiment is an example of a projector using three transmissive liquid crystal light valves as light modulation devices. As the light modulation devices, there can be used, for example, reflective liquid crystal light valves. As the light modulation devices, it is also possible to use other light modulation devices than those of the liquid crystal type such as devices using micromirrors, or devices provided with a DMD (Digital Micromirror Device) or the like.

Projector

First, a configuration of the projector 1 will be described.

As shown in FIG. 1, the projector 1 is provided with the illumination device 2, a color separation optical system 3, a light modulation device 4R, a light modulation device 4G, a light modulation device 4B, a light combining optical system 5, and a projection optical system 6. The projector 1 is provided with an optical device described later. The illumination device 2 emits illumination light WL. The color separation optical system 3 separates the illumination light WL having been emitted from the illumination device 2 into red light LR, green light LG, and blue light LB. The light modulation device 4R, the light modulation device 4G, and the light modulation device 4B respectively modulate the red light LR, the green light LG, and the blue light LB in accordance with image information to form image light of the respective colors. The light combining optical system 5 combines the respective colors of image light emitted from the light modulation device 4R, the light modulation device 4G, and the light modulation device 4B with each other. The projection optical system 6 projects the image light combined by the light combining optical system 5 toward a screen SCR.

As shown in FIG. 2, the illumination device 2 emits the illumination light WL as white light toward the color separation optical system 3. The illumination light WL includes excitation light B1 and fluorescence YL wherein the excitation light B1 is blue light emitted from a phosphor 34 passing through the phosphor 34 without being converted in wavelength out of excitation light B as blue light emitted from the illumination device 2 as described later, and the fluorescence YL is yellow light generated by the wavelength conversion of the excitation light B. The illumination light WL is adjusted by the illumination device 2 so as to have substantially homogenous illuminance distribution.

As shown in FIG. 1, the color separation optical system 3 is provided with a first dichroic mirror 7a, a second dichroic mirror 7b, a first reflecting mirror 8a, a second reflecting mirror 8b, and a third reflecting mirror 8c. The first dichroic mirror 7a separates the illumination light WL having been emitted from the illumination device 2 into the red light LR, and the light including the green light LG and the blue light LB mixed with each other. Therefore, the first dichroic mirror 7a transmits the red light LR, and at the same time, reflects the green light LG and the blue light LB. The second dichroic mirror 7b separates the light including the green light LG and the blue light LB mixed with each other into the green light LG and the blue light LB. Therefore, the second dichroic mirror 7b reflects the green light LG, and at the same time, transmits the blue light LB.

The first reflecting mirror 8a is disposed in a light path of the red light LR, and the red light LR which has been transmitted through the first dichroic mirror 7a is reflected by the first reflecting mirror 8a toward the light modulation device 4R. The second reflecting mirror 8b and the third reflecting mirror 8c are disposed in a light path of the blue light LB, and reflect the blue light LB having been transmitted through the second dichroic mirror 7b to guide the blue light LB to the light modulation device 4B.

The light modulation device 4R modulates the red light LR in accordance with the image information while making the red light LR pass through the light modulation device 4R to form red image light. Similarly, the light modulation device 4G modulates the green light LG in accordance with the image information while making the green light LG pass through the light modulation device 4G to form green image light. The light modulation device 4B modulates the blue light LB in accordance with the image information while making the blue light LB pass through the light modulation device 4B to form blue image light. The light modulation device 4R, the light modulation device 4G, and the light modulation device 4B are each formed of, for example, a liquid crystal panel. At the light incident side and the light exit side of each of the light modulation device 4R, the light modulation device 4G, and the light modulation device 4B, there are disposed polarization plates (not shown), respectively. At the incident side of the red light LR of the light modulation device 4R, there is disposed a field lens 10R for converting the red light LR entering the light modulation device 4R into parallel light. At the incident side of the green light LG of the light modulation device 4G, there is disposed a field lens 10G for converting the green light LG entering the light modulation device 4G into parallel light. At the incident side of the blue light LB of the light modulation device 4B, there is disposed a field lens 10B for converting the blue light LB entering the light modulation device 4B into parallel light.

The color combining optical system 5 is formed of, for example, a cross dichroic prism. The light combining optical system 5 combines the respective colors of image light from the light modulation device 4R, the light modulation device 4G, and the light modulation device 4B with each other, and then emits the image light thus combined toward the projection optical system 6.

The projection optical system 6 is constituted by a plurality of projection lenses. The projection optical system 6 projects the image light combined by the color combining optical system 5 toward the screen SCR in an enlarged manner. The color image thus enlarged is displayed on the screen SCR.

Illumination Device

Then, the configuration of the illumination device 2 will be described.

The illumination device 2 according to the first embodiment is an illumination device 2A provided with a light source device 11. As shown in FIG. 2, the illumination device 2A is provided with the light source device 11, an integrator optical system 31, a polarization conversion element 32, and a superimposing lens 33A. The integrator optical system 31 and the superimposing lens 33A constitute a superimposing optical system 33.

The light source device 11 is provided with an array light source 20, a collimator optical system 22, a light collection optical system 23, a first wave plate 28A, an optical element 25A including a polarization split element 50A, a first light collection optical system 26, a fluorescence emitting element 27, a second wave plate 28B, a second light collection optical system 29, and a diffusely reflecting element 30.

The array light source 20, the collimator optical system 22, the light collection optical system 23, the first wave plate 28A, the optical element 25A, the second wave plate 28B, the second light collection optical system 29, and the diffusely reflecting element 30 are arranged side by side in series on a light axis AX1. On the other hand, the fluorescence emitting element 27, the first light collection optical system 26, the optical element 25A, the integrator optical system 31, the polarization conversion element 32, and the superimposing lens 33A are arranged side by side in series on a light axis AX2. The light axis AX1 and the light axis AX2 are located in the same plane, and are perpendicular to each other.

The array light source 20 is provided with a plurality of semiconductor lasers (light sources) 21 as solid-state light sources. The plurality of semiconductor lasers 21 is arranged in an array in a plane perpendicular to the light axis AX1. The semiconductor lasers 21 each emit excitation light BL as blue light, for example, as excitation light for the phosphor 34 of the fluorescence emitting element 27. A peak wavelength of the excitation light BL is, for example, 445 nm, but can arbitrarily be changed as long as the phosphor 34 can be excited as described above, and determined in accordance with a fluorescent material of the phosphor 34, and can also be, for example, 460 nm. The array light source 20 emits a pencil having the excitation light BL.

The excitation light BL emitted from the array light source 20 enters the collimator optical system 22. The collimator optical system 22 converts the excitation light BL emitted from the array light source 20 into parallel light. The collimator optical system 22 is provided with, for example, a plurality of collimator lenses 22A arranged in an array. The collimator lenses 22A are disposed so as to correspond respectively to the semiconductor lasers 21.

The excitation light BL having passed through the collimator optical system 22 enters the light collection optical system 23. The light collection optical system 23 adjusts a flux diameter of the excitation light BL. The light collection optical system 23 is provided with, for example, a convex lens 23A and a concave lens 23B.

The excitation light BL having passed through the light collection optical system 23 enters the first wave plate 28A. The first wave plate 28A is, for example, a half-wave plate configured so as to be rotatable around the light axis AX1. The excitation light BL emitted from the semiconductor laser 21 is linearly polarized light. By appropriately setting the rotational angle of the first wave plate 28A, it is possible to convert the excitation light BL passing through the first wave plate 28A into a light beam including an S-polarization component and a P-polarization component with respect to the optical element 25A at a predetermined ratio. By rotating the first wave plate 28A, it is possible to change the ratio between the S-polarization component and the P-polarization component.

The excitation light BL, which is generated by passing through the first wave plate 28A, and includes the S-polarization component and the P-polarization component, enters the optical element 25A. The optical element 25A is, for example, a dichroic prism having wavelength selectivity. The dichroic prism has a tilted surface 50a forming an angle of 45° in the same plane with the light axis AX1 and the light axis AX2.

The tilted surface 50a is provided with the polarization split element 50A having wavelength selectivity. The polarization split element 50A has a polarization split function of splitting the excitation light BL into excitation light $BL_S$ as the S-polarization component with respect to the polarization split element 50A and blue light $BL_P$ as the P-polarization component. The polarization split element 50A reflects the excitation light $BL_S$ entering the polarization split element 50A, and transmits the blue light $BL_P$ entering the polarization split element 50A. Further, the polarization split element 50A has a color separation function of transmitting the fluorescence YL different in wavelength band from the excitation light BL irrespective of the polarization state of the fluorescence YL.

The excitation light $BL_S$ having been emitted from the polarization split element 50A enters the first light collection optical system 26. The first light collection optical system 26 converges the excitation light $BL_S$ toward the phosphor 34. The first light collection optical system 26 is provided with, for example, a first lens 26A and a second lens 26B. The excitation light $BL_S$ having been emitted from the first light collection optical system 26 enters a fluorescence emitting section 100 of the fluorescence emitting element 27 in a converged state.

The fluorescence emitting element 27 is provided with the fluorescence emitting section 100 of a reflective type having the phosphor 34 and a reflecting layer 37, a substrate 35 for supporting the fluorescence emitting section 100, and a fixation member 36 for fixing the fluorescence emitting section 100 to the substrate 35. The phosphor 34 is fixed to the substrate 35 with the fixation member 36 disposed between a side surface of the phosphor 34 and the substrate 35. The surface of the phosphor 34 at an opposite side to a side which the excitation light $BL_S$ enters has contact with the substrate 35.

The phosphor 34 includes the fluorescent material which is excited by absorbing the excitation light $BL_S$. The fluorescent material excited by the excitation light $BL_S$ emits the fluorescence YL as yellow light having a peak wavelength in a wavelength band of, for example, no less than 500 nm and no more than 700 nm. The peak wavelength (wavelength) of the fluorescence YL is different from at least the peak wavelength (wavelength) of the excitation light $BL_S$, and is decided in accordance with the fluorescent material.

At the opposite side of the phosphor 34 to the side which the excitation light $BL_S$ enters, there is disposed the reflecting layer 37. The reflecting layer 37 reflects a component proceeding toward the substrate 35 out of the fluorescence YL generated by the phosphor 34. A part of the fluorescence YL generated by the phosphor 34 is reflected by the reflecting layer 37, and is then emitted to the outside of the phosphor 34. Another part of the fluorescence YL generated by the phosphor 34 is emitted to the outside of the phosphor 34 without the intervention of the reflecting layer 37.

On a surface of the substrate 35 at the opposite side to the surface for supporting the phosphor 34, there is disposed a heatsink 38. In the fluorescence emitting element 27, since the heat generated in the phosphor 34 can be released via the heatsink 38, a heat deterioration of the phosphor 34 can be prevented.

The fluorescence YL emitted from the phosphor 34 is non-polarized light. The fluorescence YL passes through the first light collection optical system 26, and then enters the polarization split element 50A. The fluorescence YL having entered the polarization split element 50A proceeds from the polarization split element 50A toward the integrator optical system 31.

Meanwhile, the blue light $BL_P$ as P-polarized light having been emitted from the polarization split element 50A enters the second wave plate 28B. The second wave plate 28B is a quarter-wave plate disposed in the light path between, for example, the polarization split element 50A and the diffusely reflecting element 30. Therefore, the blue light BLp as the P-polarized light having been emitted from the polarization split element 50A is converted by the second wave plate 28B into, for example, blue light $BL_c1$ as clockwise circularly polarized light centering on the light axis AX1, and then enters the second light collection optical system 29. The second light collection optical system 29 is provided with, for example, a lens 29A, and makes the blue light $BL_c1$ enter the diffusely reflecting element 30 in a converged state.

The diffusely reflecting element 30 is disposed at the opposite side to the phosphor 34 in the polarization split element 50A, and diffusely reflects the blue light $BL_c1$, which has been emitted from the second light collection optical system 29, toward the polarization split element 50A. As the diffusely reflecting element 30, it is preferable to use an element or the like which causes the Lambertian reflection of the blue light $BL_c1$, and at the same time, does not disturb the polarization state.

The light reflected in a diffused state by the diffusely reflecting element 30 is hereinafter referred to as blue light $BL_c2$. By diffusely reflecting the blue light $BL_c1$, there is generated the blue light $BL_c2$ having a substantially homogenous illuminance distribution. For example, the blue light $BL_c1$ as the clockwise circularly polarized light is reflected as the blue light $BL_c2$ which is counterclockwise circularly polarized light. The blue light $BL_c2$ is converted by the second light collection optical system 29 into parallel light, and then enters the second wave plate 28B once again.

The blue light $BL_c2$ as the counterclockwise circularly polarized light is converted by the second wave plate 28B into blue light $BL_S1$ as S-polarized light. The blue light $BL_S1$ as the S-polarized light is reflected by the polarization split element 50A toward the integrator optical system 31.

The blue light $BL_S1$ is used as the illumination light WL together with the fluorescence YL having been transmitted through the polarization split element 50A. In other words, the blue light $BL_S1$ and the fluorescence YL are emitted from the polarization split element 50A toward respective directions the same as each other, and thus, there is generated the illumination light WL as the white light having the blue light $BL_S1$ having a blue color and the fluorescence YL having a yellow color mixed with each other.

The illumination light WL is emitted toward the integrator optical system 31. The integrator optical system 31 is provided with, for example, a lens array 31A, and a lens array 31B. In each of the lens arrays 31A, 31B, there is arranged a plurality of microlenses along a direction perpendicular to the light axis AX2. The illumination light WL having been transmitted through the integrator optical system 31 enters the polarization conversion element 32. The polarization conversion element 32 has a polarization split film and a wave plate. The polarization conversion element 32 converts the illumination light WL including the fluorescence YL as the non-polarized light into linearly polarized light.

The illumination light WL having been transmitted through the polarization conversion element 32 enters the superimposing lens 33A. The superimposing lens 33A homogenizes the distribution of the illuminance due to the illumination light WL in the illumination target area in cooperation with the integrator optical system 31. As described above, the illumination device 2A generates the illumination light WL.

Fluorescence Emitting Section

First, a basic structure and a principle of the nanoantenna of the fluorescence emitting section 100 will be described.

The fluorescence emitting section 100 is provided with the phosphor 34, and a nanoantenna group 131 arranged on an exit surface (an obverse surface) 34e of the phosphor 34. The exit surface 34e of the phosphor 34 is an interface between an inside of the phosphor 34 and an external space through which the fluorescence YL passes. The nanoantenna group 131 has a plurality of nanoantennas 132. The plurality of nanoantennas 132 is arranged at predetermined distances from each other on the exit surface 34e. The nanoantennas 132 are each formed so as to have, for example, a columnar shape. A shape of a bottom surface of the nanoantenna 132 is, for example, a circular shape, but is not limited to the circular shape, and can also be a rectangular shape, a polygonal shape other than the rectangular shape, a star shape, or the like. It should be noted that the planar shape of the bottom surface of the nanoantenna 132 is preferably a shape having a high rotationally symmetric property with respect to the center, and is preferably, for example, a true-circular shape or a regular polygonal shape in order to suppress an influence of the fluorescence YL on the polarization characteristic.

Figure 3:
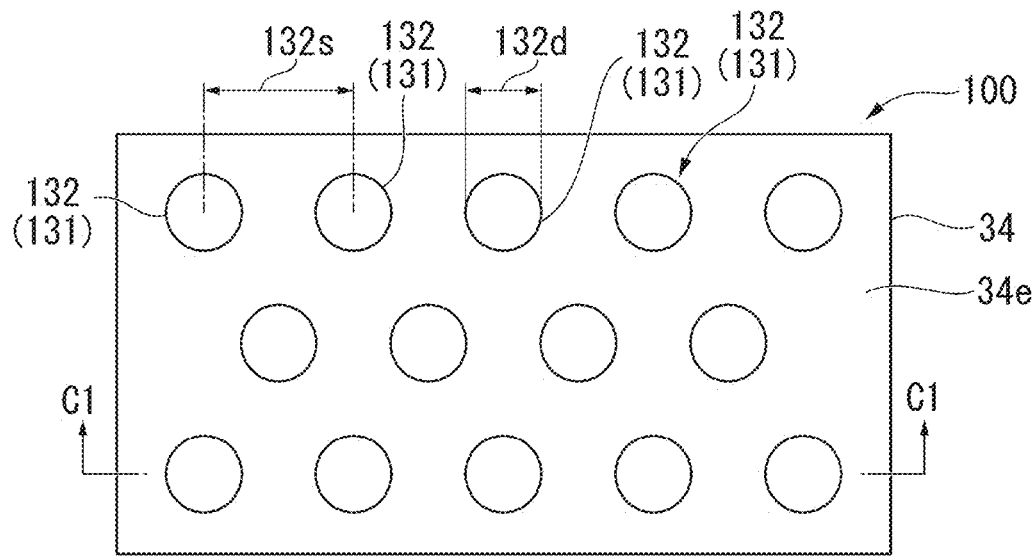
FIG. 3 is a plan view of a general fluorescence emitting section.

As shown in FIG. 3, the plurality of nanoantennas 132 is, for example, aligned along a single direction at predetermined intervals, and further arranged so as to form a plurality of lines in a direction perpendicular to the single direction described above. At an intermediate position of the centers of the two nanoantennas 132 adjacent to each other in the single direction in one of the two lines adjacent to each other in the direction perpendicular to the single direction, there is disposed the center of the nanoantenna 132 in the other of the two lines. In other words, the nanoantennas 132 forming the plurality of lines are arranged in, for example, a staggered manner. It is sufficient for the plurality of nanoantennas 132 to make the distance between the centers thereof constant to thereby be able to form a periodic structure as the nanoantenna group 131. The positions of the centers of the nanoantennas 132 in the line formed of the plurality of nanoantennas 132 can be aligned with each other in the plurality of lines.

Figure 4:
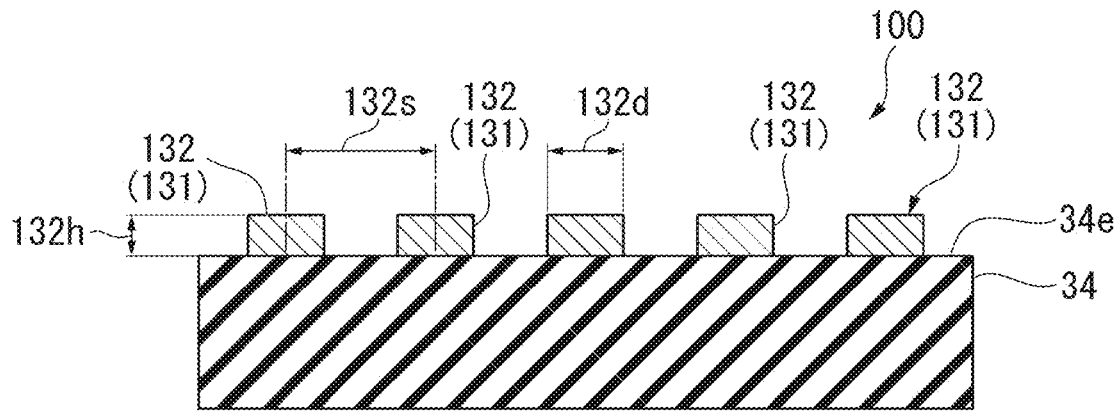
FIG. 4 is a cross-sectional view of the fluorescence emitting section shown in FIG. 3 viewed from an arrowed line C1-C1.

As shown in FIG. 3 and FIG. 4, the diameter 132d of the bottom surface of the nanoantenna 132 is, for example, about 250 nm. The height 132h of the nanoantenna 132 is, for example, about 50 nm. The distance 132s between the centers of the two nanoantennas 132 adjacent to each other on the exit surface 34e is, for example, about 450 nm. The diameter 132d, the height 132h, and the distance 132s are appropriately set taking the principle and so on of the nanoantenna described later into consideration.

When the nanoantennas 132 are formed of metal, when light enters the nanoantennas 132, conduction electrons in the vicinity of the interface of the nanoantennas 132 make collective oscillation to cause localized surface plasmon resonance (LSPR). When the diameter 132d and the distance 132s are equivalent to or shorter than the wavelength of the incident light, conduction electrons in each of the nanoantennas 132 vibrate due to electrical field polarization of the light which has entered and then confined in the nanoantenna group 131, and thus, intensive electrical field enhancement occurs on end surfaces of the nanoantennas 132. Since the nanoantenna group 131 forms the periodic structure, when the light enters the nanoantennas 132, diffraction also occurs.

Figure 5:
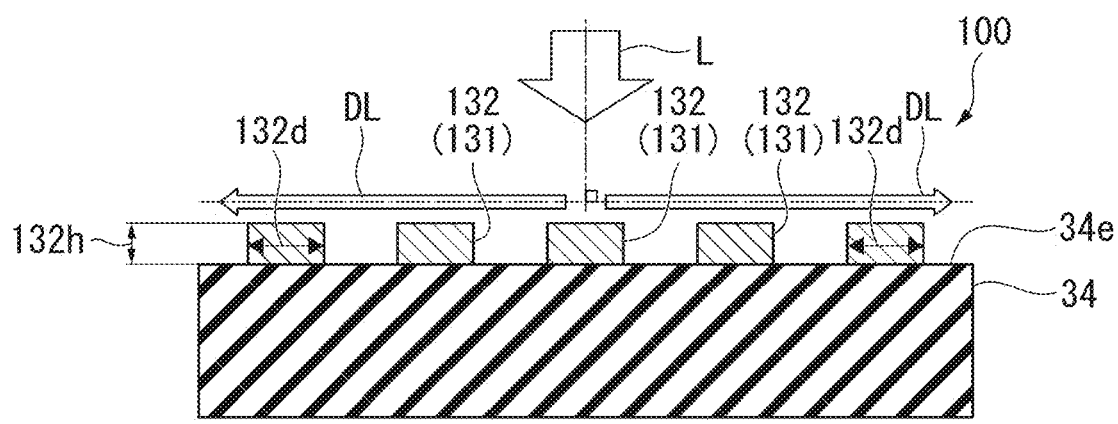
FIG. 5 is a cross-sectional view for explaining a lattice surface resonance generated in a general nanoantenna group.

As shown in FIG. 5, the diffraction with a diffraction angle of 90° with respect to the light L entering the fluorescence emitting section 100 is called a Rayleigh anomaly, and is a diffraction along a direction parallel to the exit surface 34e of the phosphor 34. In the Rayleigh anomaly, due to the combination between the LSPR and 90°-diffracted light DL, the plurality of nanoantenna 132 is uniformed in phase to cause resonance, and thus, lattice surface resonance (LSR) occurs. It is known that it is possible to realize control of a radiation angle and suppression of a color unevenness of the fluorescence source for an illumination device using the LSR (it is possible to refer to a reference such as "R. Kamakura et al.; Journal of Applied Physics, Vol. 124, p. 213105 (2018)").

Figure 6:
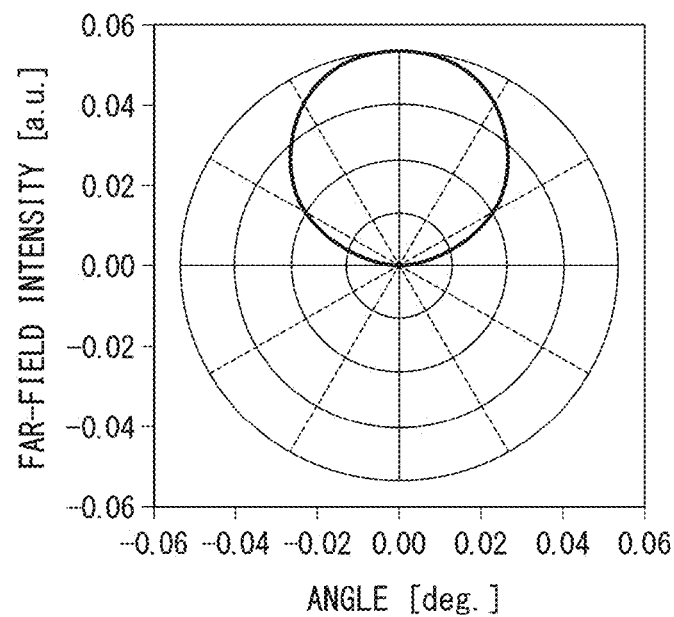
FIG. 6 is a diagram showing a result of a simulation of a radiation angle distribution of fluorescence emitted from a general phosphor.
Figure 7:
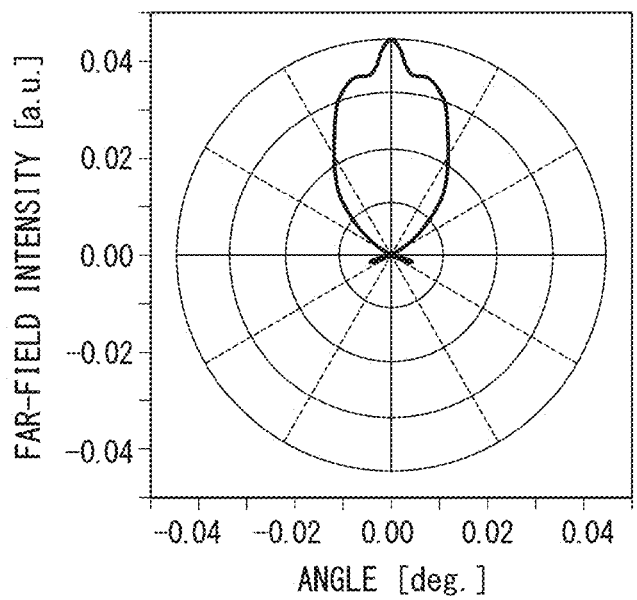
FIG. 7 is a diagram showing a result of a simulation of a radiation angle distribution of fluorescence emitted from a phosphor of the fluorescence emitting section shown in FIG. 3.

FIG. 6 shows a result of a simulation of a radiation angle distribution of the fluorescence generated from the phosphor 34 when the nanoantenna group 131 is not manufactured in the phosphor 34. In contrast, FIG. 7 shows a result of the simulation of the radiation angle distribution of the fluorescence generated from the phosphor 34 when the nanoantenna group 131 is manufactured on the exit surface 34e of the phosphor 34. In the simulation, it is assumed that the material of the nanoantennas 132 is Ag, the diameter 132d of the nanoantenna 132 when the nanoantenna group 131 is formed is set to 150 nm, the height 132h thereof is set to 150 nm, and the distance 132s between the centers of the nanoantennas 132 is set to 400 nm. As is understood from the comparison between FIG. 6 and FIG. 7, by disposing the nanoantenna group 131 on the exit surface 34e of the phosphor 34, it is possible to narrow the angle in the radiation angle distribution of the fluorescence.

The peak wavelength of the LSPR is decided in accordance with the wavelength dispersion characteristic of a dielectric constant of the material of the nanoantennas 132. For example, when the material of the nanoantennas 132 is aluminum (Al), the peak wavelength of the LSPR is around 400 nm. When the material of the nanoantennas 132 is silver (Ag) or gold (Au), the peak wavelength of the LSPR is around 500 nm, and high extinction (scattering) occurs. By arbitrarily selecting and setting the dielectric constant and other characteristics of the material of the nanoantennas 132, and dimensions of the nanoantennas 132, it is possible to adjust the peak wavelength of the LSPR. It should be noted that when the usage of the fluorescence emitting section 100 is illumination, it is preferable that the LSPR is efficiently generated in the wavelength region of the visible band, and the peak wavelength of the LSPR is included in the visible wavelength band. Therefore, it is preferable for the material of the nanoantennas 132 of the fluorescence emitting section 100 for the illumination device to be Ag or the like having the peak wavelength of the LSPR in the visible wavelength band.

Since the excitation light having watt (W) class high power enters the phosphor 34 of the fluorescence emitting section 100 for a projector in a converged state, the fluorescence emitting section 100 is a component for which heat resistance is required the most out of components constituting the projector. In addition to the fact that it is possible to realize the efficient scattering, the fact that it is difficult for the heat deterioration to be caused by a rise in temperature to occur, or the fact that such heat deterioration can be suppressed is required for the nanoantenna group 131 as a problem to solve. In the nanoantennas 132 having metal such as Ag as the material, the heat deterioration generated when being irradiated with the high-power excitation light is severer compared to materials other than metal such as a dielectric material.

As the material of the nanoantennas 132, it is possible to use a dielectric material and a semiconductor material such as silicon (Si) other than the metal which is high in thermal absorptivity and is apt to cause the heat deterioration. When the dielectric material or the semiconductor material is used as the material of the nanoantennas 132, the principle related to the decrease in the vicinity of the exit surface 34e of the phosphor 34 is not based on the combination between the LSPR and the Rayleigh anomaly described above, but based on the LSR caused by the combination between Mie scattering and the Rayleigh anomaly.

Mie resonance is a phenomenon caused by the fact that the light having entered a fine structure having a high refractive index is confined and resonates inside the fine structure. The state of the Mie resonance is decided in accordance with the shape of the nanoantennas 132 and the refractive index of the material. When the material of the nanoantennas 132 is the dielectric material or the semiconductor material, the extinction (scattering) having the peak wavelength in a specific wavelength region occurs in accordance with the shape of the nanoantennas 132 and the characteristics of the material similarly to the LSPR when the material is metal. As the material causing the Mie resonance, there can be cited a dielectric material such as titanium oxide ($TiO_2$), silicon nitride (SiN), gallium phosphide (GaP), or aluminum oxide ($Al_2O_3$), a semiconductor material such as Si, and an insulating material such as silicon oxide ($SiO_2$).

While the melting point of Ag as an example of the material causing the LSPR is 961° C., the melting point of the material causing the Mie resonance is higher than the melting point of Ag. For example, the melting point of Si is 1414° C., the melting point of $TiO_2$ is 1,834° C., and the melting point of $SiO_2$ is 1,700° C. From the viewpoint of the heat resistance, the dielectric material such as $TiO_2$ and the semiconductor material such as Si are more preferable as the material of the nanoantennas 132 compared to the metal such as Ag.

As is understood with reference to the result disclosed in the reference described above, when the dielectric material such as $Al_2O_3$ is used as the material of the nanoantennas 132, a value of scattering (scattering cross-section) is smaller and a radiation light intensity is lower compared to when the metal such as Al is used. In contrast, in the material such as Si, since a light absorption coefficient in a region no less than 400 nm to 500 nm in the visible wavelength band is high, the radiation light intensity is apt to decrease due to the light absorption.

Figure 8:
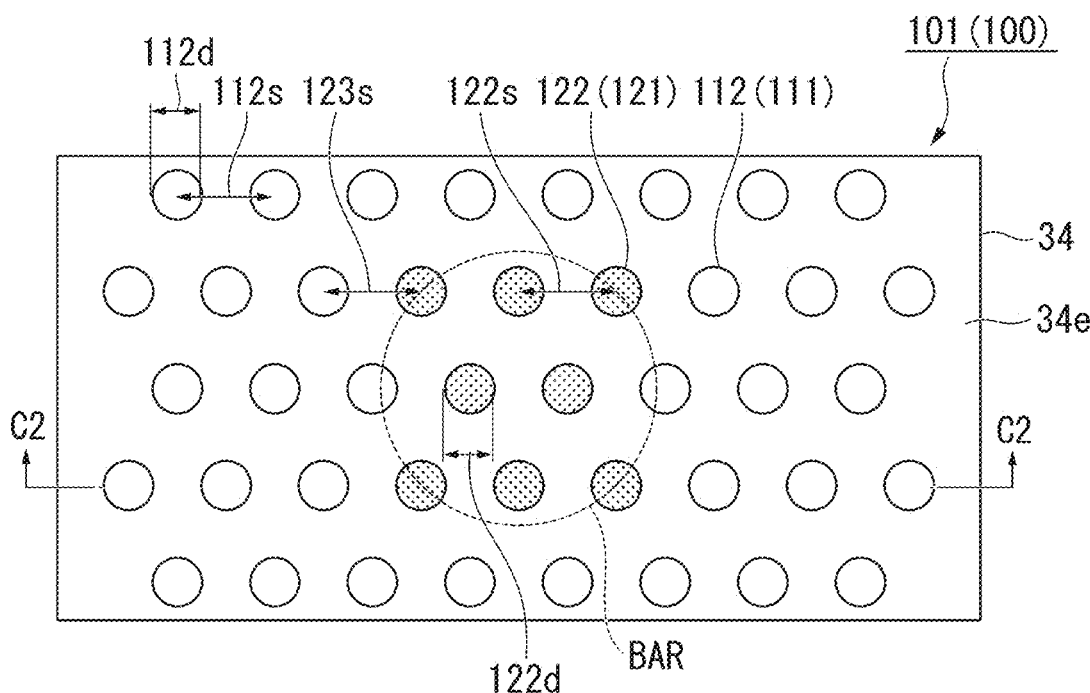
FIG. 8 is a plan view of a fluorescence emitting section in the first embodiment.
Figure 9:
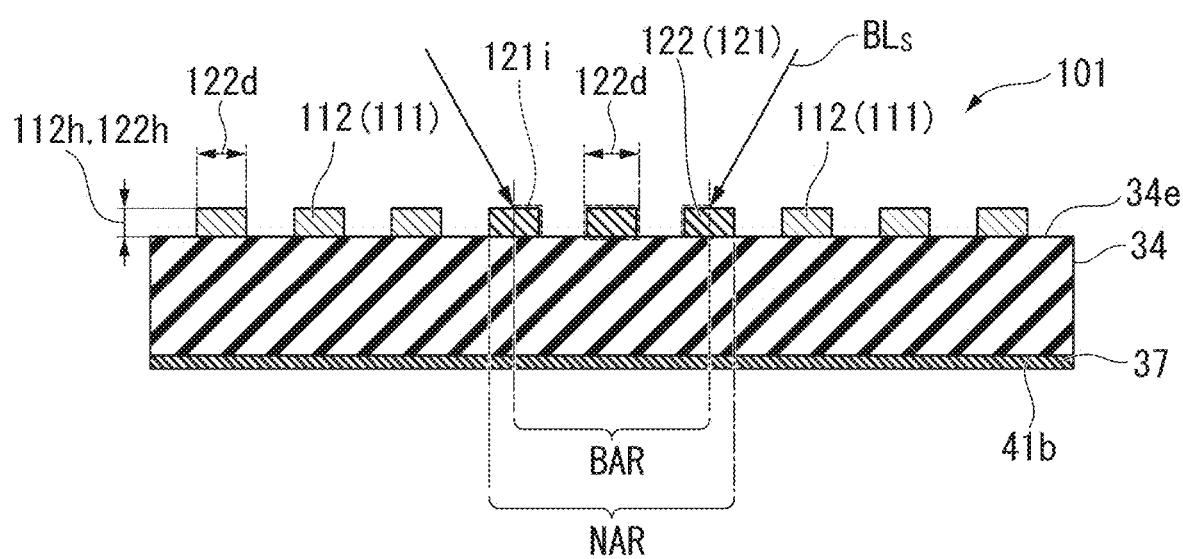
FIG. 9 is a cross-sectional view of the fluorescence emitting section shown in FIG. 8 viewed from an arrowed line C2-C2.

Then, a basic structure and a principle of the nanoantenna of the fluorescence emitting section 101 in the first embodiment will be described. As shown in FIG. 8 and FIG. 9, the fluorescence emitting section 101 is provided with the phosphor 34, a first nanoantenna group 111 and second nanoantenna group 121 arranged on the exit surface 34e of the phosphor 34, and the reflecting layer 37. It should be noted that in the drawing for explaining the configuration of the illumination device such as FIG. 2, the nanoantenna groups such as the first nanoantenna group 111 and the second nanoantenna group 121 are omitted. As shown in FIG. 8 and FIG. 9, in the fluorescence emitting section 101, the nanoantenna group 131 of the fluorescence emitting section 100 described above is constituted by the first nanoantenna group 111 and the second nanoantenna group 121, and the reflecting layer 37 is provided to the phosphor 34.

As the phosphor layer 34, it is preferable to use a material excellent in heat resistance and surface workability. As such a phosphor 34, a phosphor obtained by dispersing phosphor particles in an inorganic binder such as alumina, or a phosphor obtained by sintering the phosphor particles without using the binder, for example, are preferably used. It should be noted that the phosphor particles can be particles formed using a single species of material, or can also be those having particles formed using two or more species of materials mixed with each other.

The first nanoantenna group 111 has a plurality of first nanoantennas 112. The plurality of first nanoantennas 112 is arranged at predetermined distances from each other outside an irradiation area BAR with the excitation light $BL_S$ which enters the exit surface 34e (a plane of incidence of the excitation light $BL_S$) on the exit surface 34e when making a plan view along a thickness direction of the phosphor 34. The second nanoantenna group 121 has a plurality of second nanoantennas 122. The plurality of second nanoantennas 122 is arranged at predetermined distances from each other inside the irradiation area BAR on the exit surface 34e when making a plan view along the thickness direction of the phosphor 34. The second nanoantenna 122 which at least partially overlaps the irradiation area BAR is assumed to be arranged inside the irradiation area BAR. The excitation light $BL_S$ enters the irradiation area BAR shown in FIG. 8 and FIG. 9 from the first light collection optical system 26 shown in FIG. 2 in a converged state. The second nanoantenna group 121 is arranged inside the irradiation area BAR in a substantially central portion of, for example, the exit surface 34e.

The first nanoantennas 112 and the second nanoantennas 122 are each formed to have, for example, a columnar shape similarly to the nanoantennas 132 described above. A shape of a bottom surface of each of the first nanoantennas 112 and the second nanoantennas 122 is not limited to the circular shape, and can be a rectangular shape, a polygonal shape other than the rectangular shape, a start shape, or the like. It should be noted that similarly to the reason described in the description of the nanoantennas 132, the shape of the bottom surface of each of the first nanoantennas 112 and the second nanoantennas 122 is preferably a shape having a high rotationally symmetric property with respect to the center, and is preferably, for example, a true-circular shape or a regular polygonal shape.

The plurality of first nanoantennas 112 and the plurality of second nanoantennas 122 form a nanometer-order periodic structure as a whole. On the exit surface 34e of the phosphor 34, a distance 112s between the centers of the first nanoantennas 112 adjacent to each other, a distance 122s between the centers of the second nanoantennas 122, and a distance 123s between the center of the first nanoantenna 112 and the center of the second nanoantenna 122 are equal to each other.

Describing the distances 112s, 122s, and 123s collectively as a nanoantenna pitch a, the nanoantenna pitch a is set in a range in which the conditional expression of the Rayleigh anomaly is fulfilled in the wavelength band of the light emitted from the exit surface 34e of the phosphor 34 which is a control object of the radiation angle. The conditional expression of the Rayleigh anomaly of the triangle lattice is expressed as the formula (1) described below so that the plurality of first nanoantennas 112 and the plurality of second nanoantennas 122 are arranged in a staggered manner as illustrated in FIG. 8.

$$k_{out}^2 = k_{in}^2 + 2(2\pi/a)(m_1+m_2)k_{in} + (2\pi/a)^2(m_1+m_2)^2 + (2\pi/a)^2(m_1-m_2)^2/3 \qquad (1)$$

In the formula (1) described above, $k_{out}$ represents a wave number vector of the fluorescence YL emitted from the first nanoantenna group 111 and the second nanoantenna group 121, and $k_{in}$ represents a wave number vector of the excitation light $BL_S$ entering the first nanoantenna group 111 and the second nanoantenna group 121. In the formula described above, $m_1$, $m_2$ represent integers for determining the order of the diffracted light in the first nanoantenna group 111 and the second nanoantenna group 121.

The greatest width 112d of the bottom surface of each of the first nanoantennas 112 and the greatest width 122d of the bottom surface of each of the second nanoantennas 122 are equal to each other. The height 112h of each of the first nanoantennas 112 and the height 122h of each of the second nanoantennas 122 are equal to each other. The greatest widths 112d, 122d and the heights 112h, 122h are appropriately determined so as to fulfill the condition of the Rayleigh anomaly of the formula (1) in conjunction with the pitch a taking the principle and so on of the nanoantennas described above into consideration. The relational expression of the diffraction is determined with respect to a basically single incident angle and wavelength. Since the emission of the light from the phosphor 34 has a spread in incident angle, and has a wide wavelength range, respective representative values are extracted, and the nanoantenna pitch a and other parameters related to the first nanoantenna group 111 and the second nanoantenna group 121 are determined based on the formula (1) and so on. The condition of the Rayleigh anomaly is calculated using the nanoantenna pitch a, the wavelength (the incident wavelength) of the excitation light $BL_S$, an incident angle of the excitation light $BL_S$ to the exit surface 34e, and a refractive index of the periphery of the first nanoantenna group 111 and the second nanoantenna group 121, and does not depend on the material of the first nanoantennas 112 and the material of the second nanoantennas 122.

The first nanoantenna group 111 arranged outside the irradiation area BAR on the exit surface 34e of the phosphor 34 and the second nanoantenna group 121 arranged inside the irradiation are BAR on the exit surface 34e are formed of two types of materials different from each other. The material of the first nanoantennas 112 is metal such as Ag or Au. The material of the second nanoantennas 122 is a material which has a melting point higher than the melting point of the material of at least the first nanoantennas 112, and is difficult to thermally deteriorate when being irradiated with the excitation light $BL_S$ in the state of being converged to reach the high power. In other words, the material of the second nanoantennas 122 is higher in light stability and heat resistance compared to the material of the first nanoantennas 112.

As the material of the second nanoantennas 122, there is preferably used a dielectric material, a semiconductor material, or an insulating material having higher heat resistance compared to the material of the first nanoantennas 112 such as metal. As the dielectric material, there can be cited, for example, $TiO_2$, $SiN$, $GaP$, and $Al_2O_3$. As the semiconductor material, there can be cited $Si$ and so on. As the insulating material, there can be cited $SiO_2$ and so on. In particular, it is preferable for a range in which the second nanoantenna group 121 is arranged on the exit surface 34e of the phosphor 34 to be in the same level as a predetermined beam diameter of the excitation light $BL_S$ with which the plane of incidence 121i of the excitation light $BL_S$ in the second nanoantenna group 121 is irradiated. The predetermined beam diameter can be a so-called $1/e^2$ diameter, or a diameter with which the light intensity of 86.4% of the total light intensity of the beam (the excitation light $BL_S$) entering the second nanoantenna group 121 can be obtained.

The range in which the first nanoantenna group 111 is arranged on the exit surface 34e is other than the region comparable with the predetermined beam diameter of the excitation light $BL_S$. As the material of the first nanoantennas 112, there is preferably used the metal such as Al, Ag, or Au. By the first nanoantenna group 111 being formed of such metal, it is possible to efficiently perform the control of the radiation angle of the fluorescence YL. In reality, due to the scattering in the inside of the phosphor 34, a blur occurs in the luminous area on the exit surface 34e, and the fluorescence YL is emitted from the region in a range larger than the beam diameter on the exit surface 34e of the excitation light $BL_S$. Therefore, the fluorescence YL also enters an outer peripheral area adjacent to the irradiation area BAR. Since an amount of the blur of the fluorescence YL on the exit surface 34e varies due to the thickness or the scattering characteristic of the phosphor 34, it is preferable for the area ratio between, and the arrangement of, the first nanoantennas 112 and the second nanoantennas 122 in the outer peripheral area to appropriately be adjusted in accordance with the amount of the blur.

The reflecting layer 37 is disposed on a surface 34b at an opposite side to the exit surface 34e of the phosphor 34. As the reflecting layer 37, there is used, for example, a metal film or a dielectric multilayer film having high reflectance.

In the fluorescence emitting section 101 in the first embodiment, the SLR occurs due to the combination of the Mie resonance and the Rayleigh anomaly in a material high in heat resistance such as the dielectric material or the semiconductor material of the second nanoantennas 122 arranged mainly in the irradiation area BAR of the excitation light $BL_S$, and the SLR due to the combination of the LSPR and the Rayleigh anomaly occurs outside the region where the second nanoantennas 122 are arranged. As a result, it is possible to achieve both of the highly-efficient extraction of the fluorescence YL from the phosphor 34, and narrowing of the radiation angle and the increase in heat resistance.

In the fluorescence emitting section 101 in the first embodiment, in each of the first nanoantenna group 111 and the second nanoantenna group 121, the electric fields of the excitation light BL, B1, and the fluorescence YL are enhanced due to a mutual action between the resonance phenomenon and the Rayleigh anomaly in accordance with each of the nanoantenna groups. It is conceivable that the electric field enhancement in the first nanoantenna group 111 formed of metal is relatively higher than the electric field enhancement in the second nanoantenna group 121. It is conceivable that in contrast, the second nanoantenna group 121 formed of the material having a higher melting point than the metal material of the first nanoantennas 112 is higher in light stability and heat resistance than the first nanoantenna group 111 as described above. Therefore, in the plan view viewed from a normal direction of the phosphor 34, at least an arrangement area NAR of the second nanoantenna group 121 overlaps the irradiation area BAR of the excitation light $BL_S$.

In the viewpoint of suppressing the heat deterioration of the phosphor 34 while increasing the effect of the electric field enhancement of the excitation light BL, B1 and the fluorescence YL, it is preferable to make the arrangement area of the first nanoantenna group 111 on the exit surface 34e of the phosphor 34 as large as possible, and keep the arrangement area of the second nanoantenna group 121 as mall as possible. The arrangement area NAR of the second nanoantenna group 121 can be within a range of at least a half-value width of the light intensity of the excitation light $BL_S$ with which the plane of incidence 121i of the second nanoantenna group 121 is irradiated, namely a half diameter, or a diameter with which the light intensity 50% as much as the total light intensity of the excitation light $BL_S$ entering the second nanoantenna group 121 can be obtained. In particular, which one of the range of the half diameter of the light intensity of the excitation light $BL_S$ with which the plane of incidence 121i is irradiated, the range of the $1/e^2$ diameter, and the range of an appropriate diameter other than the diameters described above the arrangement area NAR of the second nanoantenna group 121 is set can be decided in accordance with the heat resistance or other characteristics of the material of the first nanoantennas 112.

Second Embodiment

Then, a second embodiment will be described using FIG. 10.

Besides the fact that a fluorescence emitting section 102 subsequently described is provided instead of the fluorescence emitting section 101, a projector and an illumination device according to the second embodiment are provided with substantially the same configurations as those of the projector 1 and the illumination device 2A according to the first embodiment.

In each of the second embodiment and embodiments following the second embodiment, constituents common to the embodiments described above such as the first embodiment are denoted by the same reference symbols, and the explanation thereof will be omitted.

Figure 10:
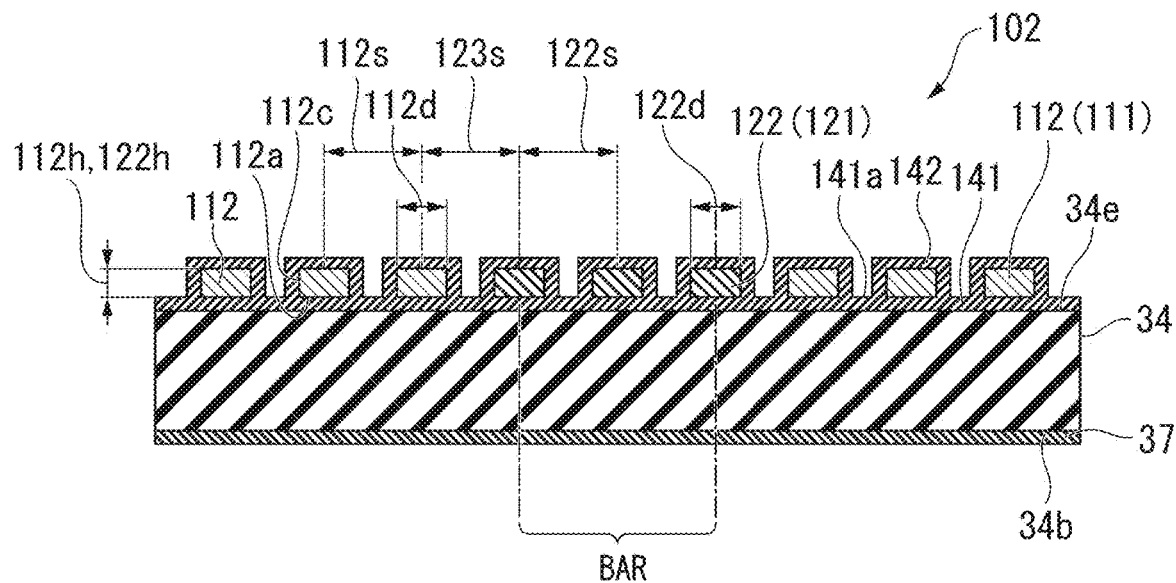
FIG. 10 is a cross-sectional view of a fluorescence emitting section in a second embodiment.

In the fluorescence emitting section 102 in the second embodiment, a base layer 141 is disposed on the exit surface 34e of the phosphor 34, the first nanoantenna group 111 and the second nanoantenna group 121 are arranged on a surface 141a of the base layer 141, and a cover layer 142 is disposed on exposed end surfaces of each of the first nanoantenna group 111 and the second nanoantenna group 121 as shown in FIG. 10 in contrast to the configuration of the fluorescence emitting section 101 in the first embodiment. In other words, the fluorescence emitting section 102 is provided with the phosphor 34, the first nanoantenna group 111, the second nanoantenna group 121, the reflecting layer 37, the base layer 141, and the cover layer 142.

The base layer 141 is disposed in the entire area of the exit surface 34e of the phosphor 34. The cover layer 142 covers side surfaces 112c of the plurality of first nanoantennas 112 arranged on the exit surface 34e so as to have contact with the exit surface 34e, and a bottom surface 112a at an opposite side to a side having contact with the exit surface 34e out of two bottom surfaces of each of the first nanoantennas 112 each formed to have a columnar shape.

By using the same material in the base layer 141 and the cover layer 142, the refractive index on the periphery of the first nanoantenna group 111 and the second nanoantenna group 121 is made substantially the same. As a result, there occurs more intensive SLR than in the fluorescence emitting section 101 in the first embodiment, and the intensity of the light radiated from the fluorescence emitting section 102 increases.

It should be noted that when the dielectric materials having respective refractive indexes different from each other are used as the material of the cover layer 142 and the material of the base layer 141, respectively, there arises a difference between the Rayleigh anomaly condition in the refractive index of the cover layer 142 and the Rayleigh anomaly condition in the refractive index of the base layer 141. As a result, the light energy is dispersed in the diffracted light DL toward the direction different between the base layer 141 and the cover layer 142.

The thickness of the dielectric material on the periphery of each of the first nanoantenna group 111 and the second nanoantenna group 121 is sufficiently in a range in which near-field light of the LSPR or the like can act as described above, and is preferably, for example, no smaller than 10 nm and no greater than 100 nm. Further, it is necessary for the relationship that "the refractive index of the cover layer 142 is lower than the refractive index of the first nanoantennas 112" to be true so as not to hinder the Mie resonance due to light confinement in the first nanoantenna group 111 and the second nanoantenna group 121.

Third Embodiment

Then, a third embodiment of the present disclosure will be described using FIG. 11.

Besides the fact that a fluorescence emitting section 103 subsequently described is provided instead of the fluorescence emitting section 101, a projector and an illumination device according to the third embodiment are provided with substantially the same configurations as those of the projector 1 and the illumination device 2A according to the first embodiment.

Figure 11:
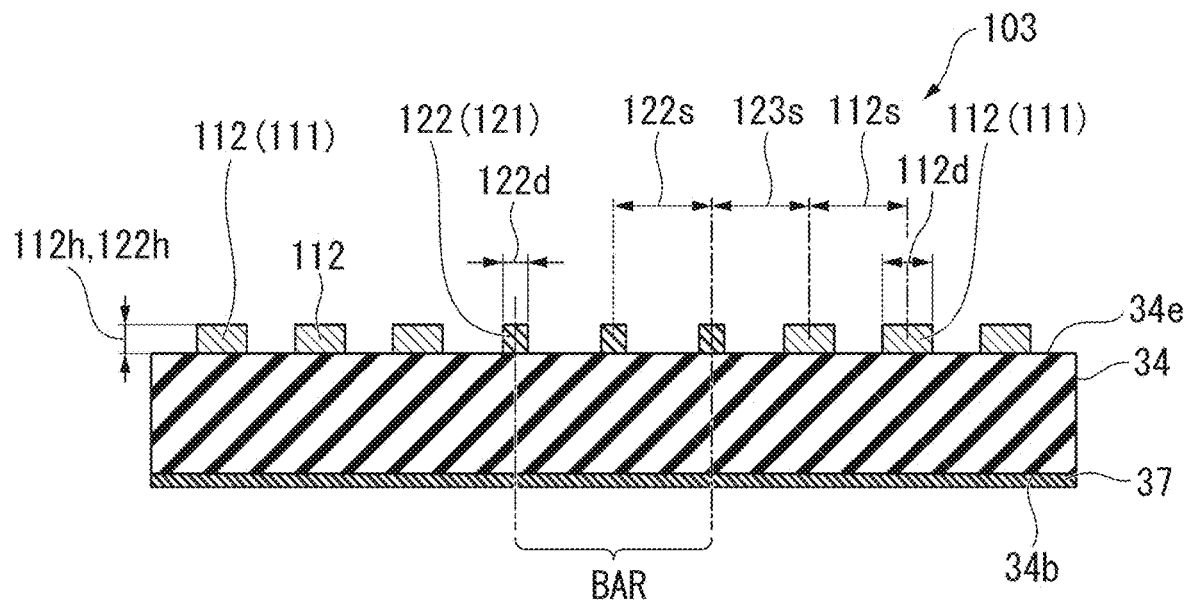
FIG. 11 is a cross-sectional view of a fluorescence emitting section in a third embodiment.

In the fluorescence emitting section 103 in the third embodiment, the greatest width 122$d$ of the second nanoantennas 122 can be different from the greatest width 112$d$ of the first nanoantennas 112 as shown in FIG. 11 in contrast to the configuration of the fluorescence emitting section 101 in the first embodiment. In FIG. 11, the greatest width 122$d$ of the second nanoantennas 122 is shorter than the greatest width 112$d$ of the first nanoantennas 112. Since the nanoantenna pitch a is a factor for deciding a diffraction angle of the Rayleigh anomaly, it is assumed that the distances 112$s$, 122$s$, and 123$s$ of the first nanoantennas 112 and the second nanoantennas 122 are the same as each other. On the other hand, the greatest widths 112$d$, 122$d$ and the heights 112$h$, 122$h$ of the first nanoantennas 112 and the second nanoantennas 122 are factors for deciding the condition of the resonance of every nanoantenna. In other words, the greatest widths 112$d$, 122$d$ and the heights 112$h$, 122$h$ are factors for deciding the condition of the LSPR in the first nanoantenna group 111, and the Mie resonance in the second nanoantenna group 121.

As an example of the factor for deciding the LSPR in the first nanoantenna group 111, attention is focused on the greatest width (the diameter) 112$d$ of the first nanoantennas 112. There is performed a simulation on a reflectance spectrum distribution when using Ag as the material of the first nanoantennas 112, and varying the greatest width 112$d$. Parameters other than the greatest width 112$d$ in the simulation are set as described below. It should be noted that i is an imaginary unit.

refractive index of Ag: 0.135+i3.20 at wavelength of 550 nm nanoantenna pitch a (=a distance between the centers of the first nanoantennas 112, 112 adjacent to each other): 450 nm height 112$h$ of the first nanoantennas 112: 50 nm In the simulation described above, in order to make the explanation of a change in the LSPR with respect to a change in the greatest width 112$d$ easy to understand, it is assumed that only the first nanoantennas 112 are formed on the exit surface 34$e$ of the phosphor 34, and the values of the parameters described above other than the greatest width 112$d$ are fixed.

Figure 12:
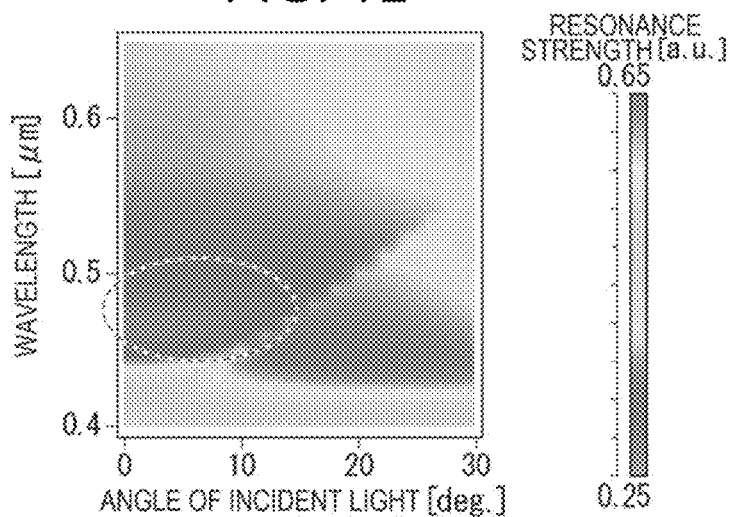
FIG. 12 is a diagram showing a result of a simulation of a change of a reflection spectrum when a maximum width of a first nanoantenna of the fluorescence emitting section is 200 nm.
Figure 13:
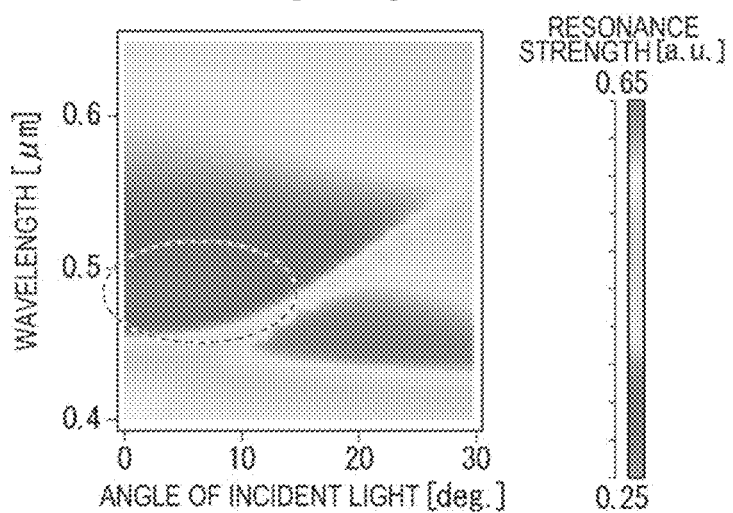
FIG. 13 is a diagram showing a result of the simulation of the change of the reflection spectrum when the maximum width of the first nanoantenna of the fluorescence emitting section is 250 nm.
Figure 14:
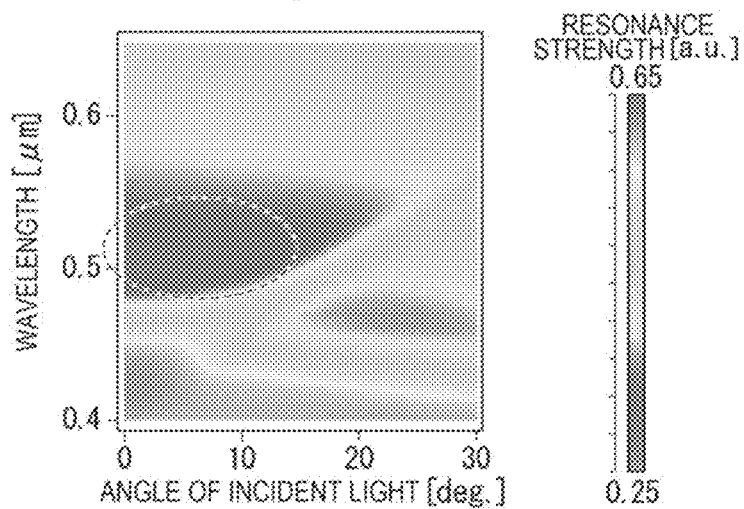
FIG. 14 is a diagram showing a result of the simulation of the change of the reflection spectrum when the maximum width of the first nanoantenna of the fluorescence emitting section is 300 nm.

FIG. 12 through FIG. 14 show the simulation results when the greatest width 112$d$ is 200 nm, 250 nm, and 300 nm, respectively. As surrounded by a dotted line in FIG. 12 through FIG. 14, it is understood that the wavelength band and the resonance strength of the LSPR change in accordance with the greatest width 112$d$, and the greater the greatest width 112$d$ becomes, the more the peak wavelength (the central wavelength) of the LSPR is shifted toward the longer wavelength side.

Therefore, it becomes necessary to optimize the greatest width 112$d$ of the first nanoantennas 112 in accordance with the wavelength to be the target of the control of the radiation angle, namely the peak wavelength of the fluorescence YL. In the fluorescence emitting section 103, since the materials and the resonance phenomena different from each other are respectively used in an area (inside the irradiation area BAR) where the Mie resonance is made to act as the principle and an area (outside the irradiation area BAR) where the LSPR is made to act as the principle, the greatest width 112$d$ the most suitable for the first nanoantennas 112 and the greatest width (the diameter) 122$d$ the most suitable for the second nanoantennas 122 are different from each other. In each of the first nanoantenna group 111 and the second nanoantenna group 121, by making the wavelength band to be the object of the control of the radiation angle and the resonant wavelength band coincide with each other, it is possible to realize the nanoantenna structure high in radiation light intensity. In other words, it is preferable for the peak wavelength at which the resonance occurs due to the LSPR in the first nanoantenna group 111 to be close to the peak wavelength of the fluorescence YL, and it is preferable, for example, for a difference between the peak wavelengths to be within 50 nm. Further, it is preferable for the peak wavelength at which the resonance occurs due to the Mie resonance in the second nanoantenna group 121 to be close to the peak wavelength of the excitation light $BL_S$, and it is preferable, for example, for the difference between the peak wavelengths to be within 50 nm.

In the fluorescence emitting section 103 in the third embodiment, the greatest width 122$d$ of the second nanoantennas 122 can be different from the greatest width 112$d$ of the first nanoantennas 112 in accordance with a resonance phenomenon acting in each of the nanoantenna groups as described above in contrast to the configuration of the fluorescence emitting section 102 in the second embodiment.

Fourth Embodiment

Figure 15:
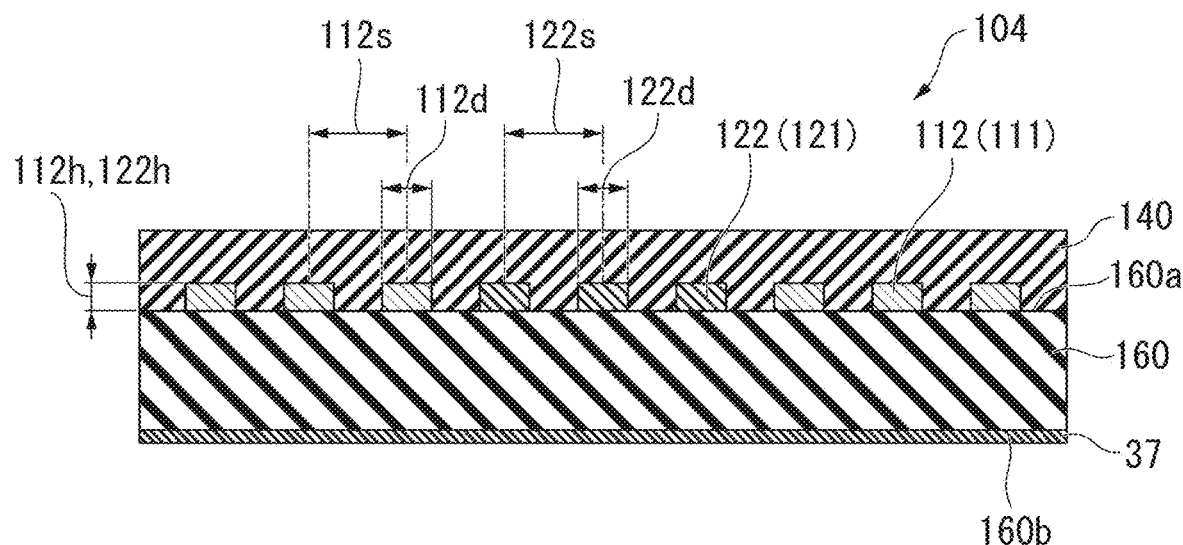
FIG. 15 is a cross-sectional view of a fluorescence emitting section in a fourth embodiment.

Then, a fourth embodiment of the present disclosure will be described using FIG. 15.

Besides the fact that a fluorescence emitting section 104 subsequently described is provided instead of the fluorescence emitting section 101, a projector and an illumination device according to the fourth embodiment are provided with substantially the same configurations as those of the projector 1 and the illumination device 2A according to the first embodiment.

In the fluorescence emitting section 104 in the fourth embodiment, the first nanoantenna group 111 and the second nanoantenna group 121 are arranged inside a phosphor layer (phosphor) 140 in contrast to the configuration of the fluorescence emitting section 101 in the first embodiment. As shown in FIG. 15, in the fluorescence emitting section 104, in contrast to the configuration of the fluorescence emitting section 101 in the first embodiment, a transparent substrate 160 is disposed instead of the phosphor 34, and the phosphor layer 140 is disposed so as to cover a surface 160a of the transparent substrate 160 exposed at the incident side of the excitation light $BL_S$, the first nanoantenna group 111, and the second nanoantenna group 121. In other words, the fluorescence emitting section 102 is provided with the transparent substrate 160, the first nanoantenna group 111, the second nanoantenna group 121, the reflecting layer 37, and the phosphor layer 140.

The first nanoantenna group 111 and the second nanoantenna group 121 are disposed on the surface 160a at the incident side of the excitation light $BL_S$ in the transparent substrate 160. The dimensions such as the greatest width 112d and the height 112h of the first nanoantennas 112, the greatest width 122d and the height 122h of the second nanoantennas 122, the nanoantenna pitch a, and so on and the materials of the first nanoantennas 112 and the second nanoantennas 122 can be considered in substantially the same manner as the dimensions and the material of each of the first nanoantenna group 111 and the second nanoantenna group 121 of the fluorescence emitting section 101 in the first embodiment.

In the manufacturing process of the first nanoantenna group 111 and the second nanoantenna group 121, when a material in which bubbles enter the inside of the phosphor when being formed as the phosphor such as sintered YAG (yttrium aluminum garnet) phosphor particles is used as the phosphor 34 of each of the fluorescence emitting sections 101 through 103 described above, an asperity occurs on the exit surface 34e. When the asperity occurs on the exit surface 34e, it is difficult to manufacture the first nanoantenna group 111 and the second nanoantenna group 121 directly on the exit surface 34e, and it is necessary to execute planarization processing of the exit surface 34e of the phosphor 34 before manufacturing the first nanoantenna group 111 and the second nanoantenna group 121, and the number of processes of the manufacturing processing of the fluorescence emitting section increases.

It is preferable for the transparent substrate 160 to be transparent in at least the wavelength bands of the excitation light $BL_S$ and the fluorescence YL, and have a total light transmittance of no lower than 90 with respect to the light in the wavelength bands of, for example, the excitation light $BL_S$ and the fluorescence YL. As the transparent substrate 160, there is preferably used a substrate made of, for example, quartz ($SiO_2$).

As the phosphor particles included in the phosphor layer 140, there is used, for example, a YAG-group phosphor. It should be noted that the phosphor particles can be unique, or can also be a mixture of particles formed using two or more types of materials. Similarly to the phosphor 34, it is preferable to use a material excellent in heat resistance and surface workability as the phosphor layer 140. When using a pigment fluorescence material such as a Lumogen F series colorant made by BASF as the material of the phosphor layer 140, it is possible to easily arrange the first nanoantenna group 111 and the second nanoantenna group 121 inside the phosphor layer 140 in the thickness direction using a method of applying the material described above in the manufacturing process of the phosphor layer 140.

The reflecting layer 37 is disposed on a surface 160b at an opposite side to the surface 160a of the transparent substrate 160. In the fluorescence emitting section 104, a part of the fluorescence YL emitted from the phosphor layer 140 excited by the excitation light $BL_S$ and the blue light BL having passed through the phosphor layer 140 passes through the transparent substrate 160, and is then reflected by the reflecting layer 37, then passes through the transparent substrate 160 and the phosphor layer 140, and is then emitted from the fluorescence emitting section 104.

According to the fluorescence emitting section 104 in the fourth embodiment, similarly to the fluorescence emitting section 101 in the first embodiment, the material high in heat resistance such as the dielectric material as the material of the second nanoantennas 122 or the semiconductor is used in the irradiation area BAR with the excitation light $BL_S$, and the metal is used as the material of the first nanoantennas 112 outside the irradiation area BAR. As a result, it is possible to perform the efficient control of the radiation angle of the fluorescence YL to achieve both of the efficient extraction of the fluorescence YL from the phosphor layer 140, and the narrowing of the radiation angle and the increase in heat resistance.

Fifth Embodiment

Figure 16:
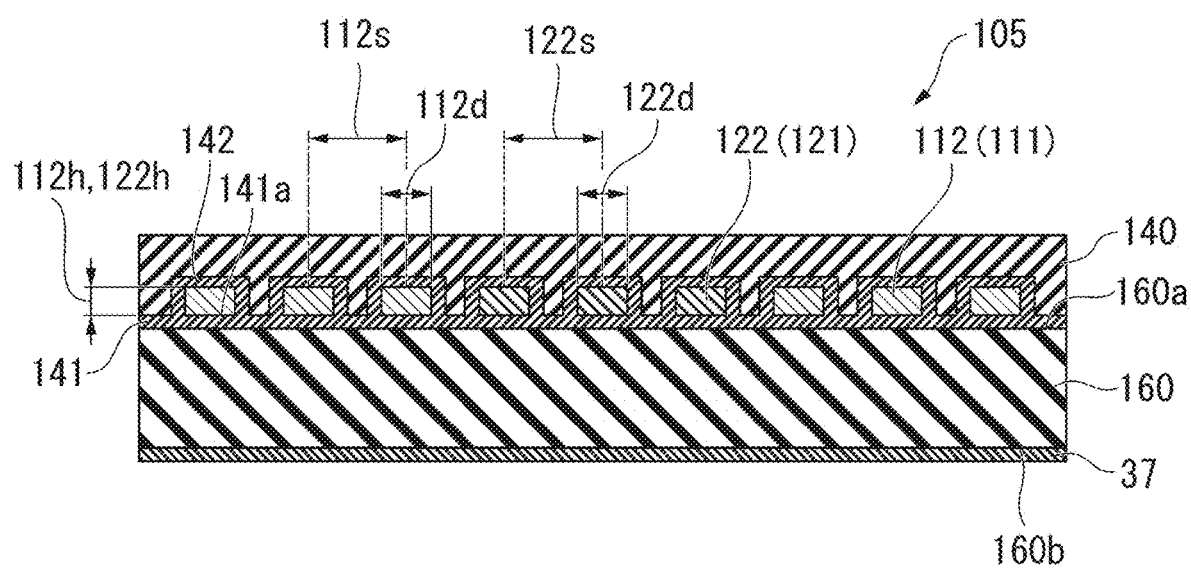
FIG. 16 is a cross-sectional view of a fluorescence emitting section in a fifth embodiment.

Then, a fifth embodiment of the present disclosure will be described using FIG. 16.

Besides the fact that a fluorescence emitting section 105 subsequently described is provided instead of the fluorescence emitting section 101, a projector and an illumination device according to the fifth embodiment are provided with substantially the same configurations as those of the projector 1 and the illumination device 2A according to the first embodiment.

In the fluorescence emitting section 105 in the fifth embodiment, the first nanoantenna group 111, the second nanoantenna group 121, the base layer 141, and the cover layer 142 are arranged inside the phosphor layer 140 in contrast to the configuration of the fluorescence emitting section 102 in the second embodiment. As shown in FIG. 16, in the fluorescence emitting section 105, in contrast to the configuration of the fluorescence emitting section 102 in the second embodiment, the transparent substrate 160 is disposed instead of the phosphor 34, and the phosphor layer 140 is disposed so as to cover the surface 141a of the base layer 141 exposed at the incident side of the excitation light $BL_S$ and the cover layer 142. In other words, the fluorescence emitting section 105 is provided with the transparent substrate 160, the base layer 141, the cover layer 142, the first nanoantenna group 111, the second nanoantenna group 121, the reflecting layer 37, and the phosphor layer 140.

Similarly to the fluorescence emitting section 102 in the second embodiment, in the fluorescence emitting section 105, by using the same material in the base layer 141 and the cover layer 142, the refractive index on the periphery of the first nanoantenna group 111 and the second nanoantenna group 121 is made substantially the same. According to such a fluorescence emitting section 105, there occurs more intensive SLR than in the fluorescence emitting section 104 in the fourth embodiment, and it is possible to increase the intensity of the light radiated from the fluorescence emitting section 105. The thickness of the base layer 141 and the cover layer 142 on the periphery of each of the first nanoantenna group 111 and the second nanoantenna group 121 is sufficiently in a range in which an influence of near-field light of the LSPR or the like is exerted, and is preferably, for example, no smaller than 10 nm and no greater than 100 nm. Further, on the same grounds as the grounds described in the second embodiment, it is necessary for the relationship that the refractive index of the cover layer 142 is lower than the refractive index of the first nanoantennas 112 to be true.

Sixth Embodiment

Then, a sixth embodiment of the present disclosure will be described using FIG. 17.

Besides the fact that a fluorescence emitting section 106 subsequently described is provided instead of the fluorescence emitting section 101, a projector and an illumination device according to the sixth embodiment are provided with substantially the same configurations as those of the projector 1 and the illumination device 2A according to the first embodiment.

In the fluorescence emitting section 106 in the sixth embodiment, the first nanoantenna group 111 and the second nanoantenna group 121 are arranged inside the phosphor layer 140 in contrast to the configuration of the fluorescence emitting section 103 in the third embodiment. As shown in FIG. 17, in the fluorescence emitting section 106, in contrast to the configuration of the fluorescence emitting section 103 in the third embodiment, the transparent substrate 160 is disposed instead of the phosphor 34, and the phosphor layer 140 is disposed so as to cover the surface 160a of the transparent substrate 160 exposed at the incident side of the excitation light $BL_S$, the first nanoantenna group 111, and the second nanoantenna group 121. In other words, the fluorescence emitting section 106 is provided with the transparent substrate 160, the first nanoantenna group 111, the second nanoantenna group 121, the reflecting layer 37, and the phosphor layer 140.

Figure 17:
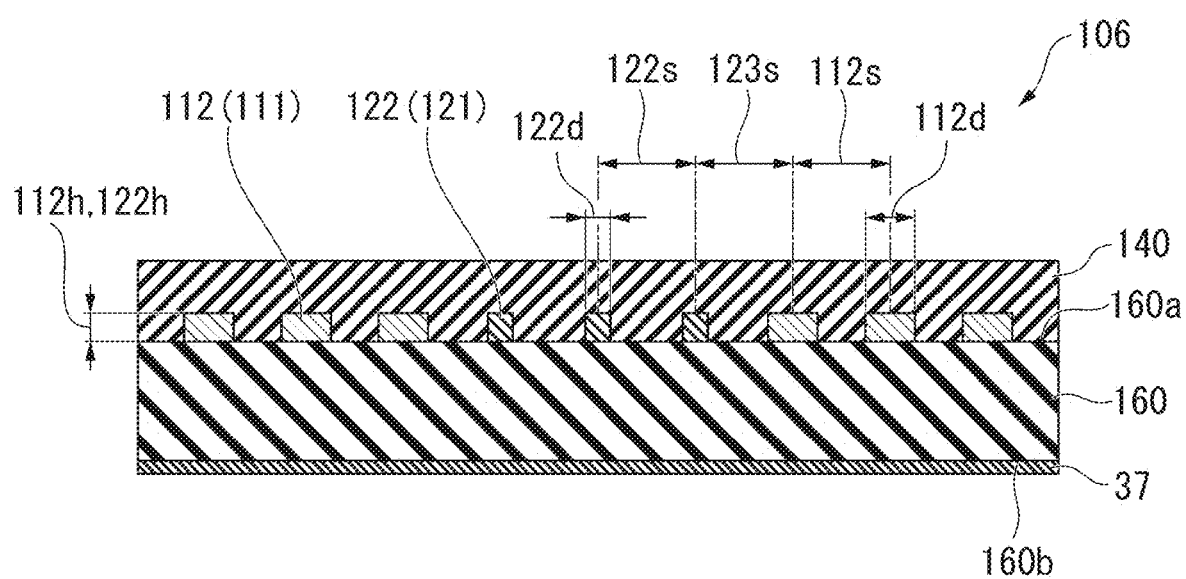
FIG. 17 is a cross-sectional view of a fluorescence emitting section in a sixth embodiment.

In the fluorescence emitting section 106 in the sixth embodiment, the greatest width 122d of the second nanoantennas 122 can be different from the greatest width 112d of the first nanoantennas 112 as shown in FIG. 17 in contrast to the configuration of the fluorescence emitting section 104 in the fourth embodiment. In FIG. 17, there is shown an example in which the greatest width 122d of the second nanoantennas 122 is shorter than the greatest width 112d of the first nanoantennas 112. As described in the third embodiment, since the nanoantenna pitch a is a factor for deciding the diffraction angle of the Rayleigh anomaly, the distances 112s, 122s, and 123s of the first nanoantennas 112 and the second nanoantennas 122 are the same as each other. On the other hand, the greatest widths 112d, 122d and the heights 112h, 122h of the first nanoantennas 112 and the second nanoantennas 122 are decided in accordance with the conditions of the LSPR in the first nanoantenna group 111 and the Mie resonance in the second nanoantenna group 121.

On the same grounds as the grounds described in the third embodiment, in the fluorescence emitting section 106, since the materials and the resonance phenomena different from each other are respectively used in the area (inside the irradiation area BAR) where the Mie resonance is made to act as the principle and the area (outside the irradiation area BAR) where the LSPR is made to act as the principle, the greatest width (the diameter) 112d the most suitable for the first nanoantennas 112 and the greatest width (the diameter) 122d the most suitable for the second nanoantennas 122 are different from each other. In each of the first nanoantenna group 111 and the second nanoantenna group 121, by making the wavelength band to be the object of the control of the radiation angle and the resonant wavelength band coincide with each other, it is possible to realize the nanoantenna structure high in radiation light intensity.

Seventh Embodiment

Then, a seventh embodiment of the present disclosure will be described using FIG. 17 and FIG. 18.

Besides the fact that an illumination device 2B subsequently described is provided instead of the illumination device 2A, a projector according to the seventh embodiment is provided with substantially the same configuration as that of the projector 1 according to the first embodiment.

Illumination Device

The illumination device 2 according to the seventh embodiment is the illumination device 2B provided with a light source device 12. As shown in FIG. 18, the illumination device 2B is provided with the light source device 12, the integrator optical system 31, the polarization conversion element 32, and the superimposing lens 33A.

The light source device 12 is provided with the array light source 20, the collimator optical system 22, a light collection optical system 42, a dichroic film 52, a fluorescence emitting section 150 of a transmissive type, and a pickup optical system 60. The array light source 20, the collimator optical system 22, the light collection optical system 42, the fluorescence emitting section 150, and the pickup optical system 60 are arranged side by side in this order on the light axis AX2.

The array light source 20 is provided with the plurality of semiconductor lasers (light sources) 21 as solid-state light sources. The plurality of semiconductor lasers 21 is arranged in an array in a plane perpendicular to the light axis AX2.

The light collection optical system 42 is formed of, for example, a single convex lens 42A. The light collection optical system 42 is arranged on the light axis AX2 of the excitation light BL emitted from the array light source 20, and converges the excitation light BL having been converted by the collimator optical system 22 into parallel light on the fluorescence emitting section 150.

The fluorescence emitting section 150 has a function of transmitting a part of the excitation light BL as blue light emitted from the array light source 20, and converting the rest of the excitation light BL into the fluorescence YL. The fluorescence emitting section 150 includes phosphor particles which absorb the rest of the excitation light BL to emit the fluorescence YL as yellow light including red light and green light. The peak wavelength in the emission intensity of the fluorescence YL is, for example, about 550 nm.

The dichroic film 52 is disposed at an incident side of the excitation light BL in the fluorescence emitting section 150, and is arranged adjacent to the fluorescence section 150 in a direction along the light axis AX2. The dichroic film 52 transmits the excitation light BL while reflecting the fluorescent light YL. By combining the fluorescence YL and a part of the excitation light BL having been transmitted through the fluorescence emitting section 150, namely blue light, with each other, the illumination light WL as white light is generated.

The pickup optical system 60 is provided with, for example, a pickup lens 62 and a pickup lens 64. The pickup optical system 60 takes in the illumination light WL emitted from the fluorescence emitting section 150, and at the same time, converts the illumination light WL thus taken in into substantially parallel light, and then emits the result toward the integrator optical system 31. The integrator optical system 31 is provided with, for example, a lens array 31C, and a lens array 31D. In each of the lens arrays 31C, 31D, there is arranged a plurality of microlenses along a direction perpendicular to the light axis AX2.

As described with respect to the illumination device 2A in the first embodiment, the illumination light WL which enters the integrator optical system 31, and is then transmitted through the integrator optical system 31 enters the polarization conversion element 32. The polarization conversion element 32 converts the illumination light WL including the fluorescence YL as the non-polarized light into linearly polarized light. The illumination light WL having been transmitted through the polarization conversion element 32 generates the illumination light WL homogenized in illuminance distribution in the illumination target area due to the cooperation of the superimposing lens 33A and the integrator optical system 31. As described above, the illumination device 2B generates the illumination light WL.

According to the illumination device 2B in the seventh embodiment, it is possible to achieve the substantially linear optical system arrangement along the light axis AX2, and it is possible to easily assemble and design the optical system.

Fluorescence Emitting Section

In contrast to the configuration of the fluorescence emitting section 101 in the first embodiment, a fluorescence emitting section 151 in the seventh embodiment is not provided with the reflecting layer 37, and the dichroic film 52 described above is used instead of the reflecting layer 37. In other words, the fluorescence emitting section 151 is provided with the phosphor 34, the first nanoantenna group 111, and the second nanoantenna group 121.

In the fluorescence emitting section 101 in the first embodiment, the excitation light BL and the fluorescence YL are emitted from the exit surface 34e of the phosphor 34, and at the same time, the excitation light $BL_S$ also enters the phosphor 34 from the exit surface 34e. In the fluorescence emitting section 151 in the seventh embodiment, the excitation light BL and the fluorescence YL are emitted from the exit surface 34e of the phosphor 34, but the excitation light BL emitted from the light collection optical system 42 enters the phosphor 34 from the surface (a plane of incidence) 34b at an opposite side to the exit surface 34e of the phosphor 34.

The plurality of first nanoantennas 112 is arranged at the nanoantenna pitch a outside an irradiation area BAQ of the excitation light BL emitted from the exit surface 34e (the exit surface of the excitation light $BL_S$) on the exit surface 34e. The irradiation area BAQ has substantially the same size as that of the irradiation area BAR described in the first embodiment, and is slightly larger than the irradiation area BAR to be precise depending on the thickness of the phosphor 34 and the degree of diffraction of the outgoing light TL and so on. The outgoing light TL is blue light entering the pickup optical system 60 shown in FIG. 18. Particularly, it is preferable for a range in which the second nanoantenna group 121 is arranged on the exit surface 34e of the phosphor 34 to be in the same level as a predetermined beam diameter of the outgoing light TL with which the exit surface 121e of the outgoing light TL in the second nanoantenna group 121 is irradiated. The predetermined beam diameter can be a so-called $1/e^2$ diameter, or a diameter with which the light intensity of 86.4% of the total light intensity of the beam (the outgoing light TL) entering the second nanoantenna group 121 can be obtained.

According to the fluorescence emitting section 151 in the seventh embodiment, the SLR occurs due to the combination of the Mie resonance and the Rayleigh anomaly in a material high in heat resistance of the second nanoantennas 122 arranged in the irradiation area BAQ of the outgoing light TL having high power, and the SLR due to the combination of the LSPR and the Rayleigh anomaly in a metal material of the first nanoantennas occurs outside the irradiation area BAQ. As a result, it is possible to achieve both of the highly-efficient extraction of the fluorescence YL from the phosphor 34, and narrowing of the radiation angle and the increase in heat resistance.

In the fluorescence emitting section 151 in the seventh embodiment, in each of the first nanoantenna group 111 and the second nanoantenna group 121, the electric fields of the excitation light BL, and the fluorescence YL are enhanced due to a mutual action between the resonance phenomenon and the Rayleigh anomaly in accordance with each of the nanoantenna groups. In the plan view viewed from a normal direction of the phosphor 34, at least an arrangement area NAR of the second nanoantenna group 121 overlaps the irradiation area BAQ of the excitation light BL. From the viewpoint of suppressing the heat deterioration of the phosphor 34 while increasing the effect of the electric field enhancement of the excitation light B1 and the fluorescence YL, the arrangement area NAR of the second nanoantenna group 121 on the exit surface 34e of the phosphor 34 can be within a range of the half-value width of the light intensity of the excitation light $BL_S$ with which the exit surface 121e of the second nanoantenna group 121 is irradiated, namely a half diameter, or a diameter in which the light intensity of 50% of the total light intensity of the excitation light $BL_S$ entering the second nanoantenna group 121 can be obtained, and the smaller the more preferable. Similarly to the transmissive fluorescence emitting section, which one of the range of the half diameter of the light intensity of the excitation light $BL_S$ with which the exit surface 121e is irradiated, the range of the $1/e^2$ diameter, and the range of an appropriate diameter other than the diameters described above the arrangement area NAR of the second nanoantenna group 121 is set can be decided in accordance with the heat resistance or other characteristics of the material of the first nanoantennas 112.

Eighth Embodiment

Then, an eighth embodiment of the present disclosure will be described using FIG. 20.

Besides the fact that a fluorescence emitting section 152 subsequently described is provided instead of the fluorescence emitting section 151, a projector and an illumination device according to the eighth embodiment are provided with substantially the same configurations as those of the projector and the illumination device 2B according to the seventh embodiment.

Figure 20:
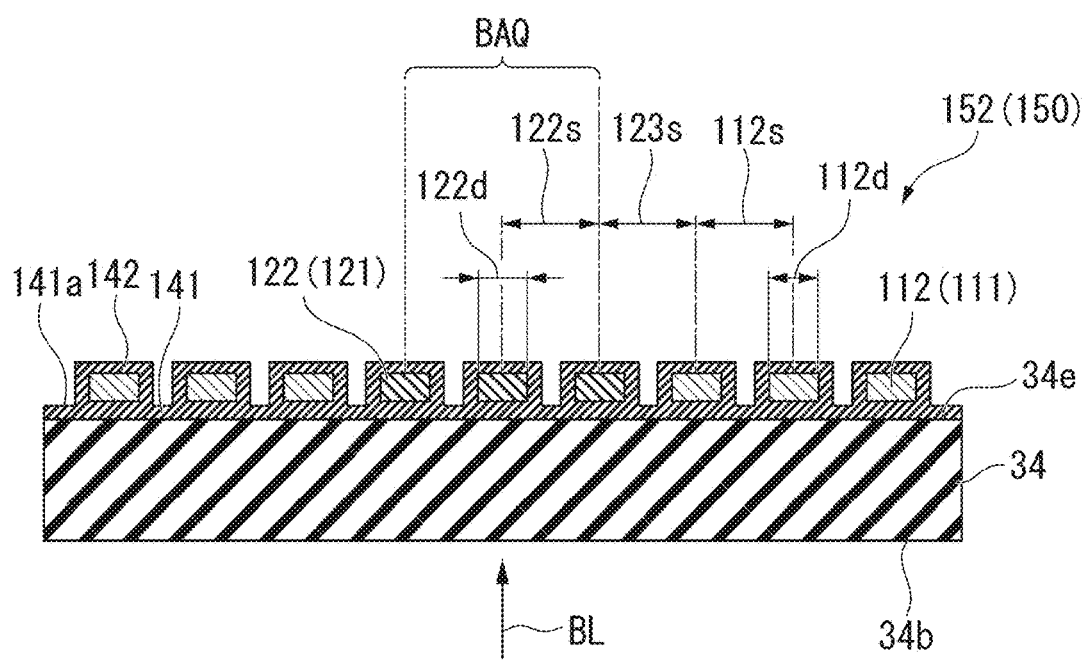
FIG. 20 is a cross-sectional view of a fluorescence emitting section in an eighth embodiment.

In the fluorescence emitting section 152 in the eighth embodiment, the base layer 141 is disposed on the exit surface 34e of the phosphor 34, the first nanoantenna group 111 and the second nanoantenna group 121 are arranged on the surface 141a of the base layer 141, and the cover layer 142 is disposed on the exposed end surfaces of each of the first nanoantenna group 111 and the second nanoantenna group 121 as shown in FIG. 20 in contrast to the configuration of the fluorescence emitting section 151 in the seventh embodiment. In other words, the fluorescence emitting section 152 is provided with the phosphor 34, the first nanoantenna group 111, the second nanoantenna group 121, the base layer 141, and the cover layer 142.

As described in the second embodiment, by using the same material in the base layer 141 and the cover layer 142, the refractive index on the periphery of the first nanoantenna group 111 and the second nanoantenna group 121 is made substantially the same. According to the fluorescence emitting section 152 in the eighth embodiment, there occurs the more intensive SLR than, for example, in the fluorescence emitting section 151 in the seventh embodiment, and thus, it is possible to enhance the intensity of the light radiated from the fluorescence emitting section 152.

It should be noted that when the dielectric materials having respective refractive indexes different from each other are used as the material of the cover layer 142 and the material of the base layer 141, respectively, there arises a difference between the Rayleigh anomaly condition in the refractive index of the cover layer 142 and the Rayleigh anomaly condition in the base layer 141, and therefore, it is necessary to select the materials of the base layer 141 and the cover layer 142 so as to correspond to the respective conditions.

Ninth Embodiment

Then, a ninth embodiment of the present disclosure will be described using FIG. 21.

Besides the fact that a fluorescence emitting section 153 subsequently described is provided instead of the fluorescence emitting section 151, a projector and an illumination device according to the ninth embodiment are provided with substantially the same configurations as those of the projector 1 and the illumination device 2B according to the seventh embodiment.

Figure 21:
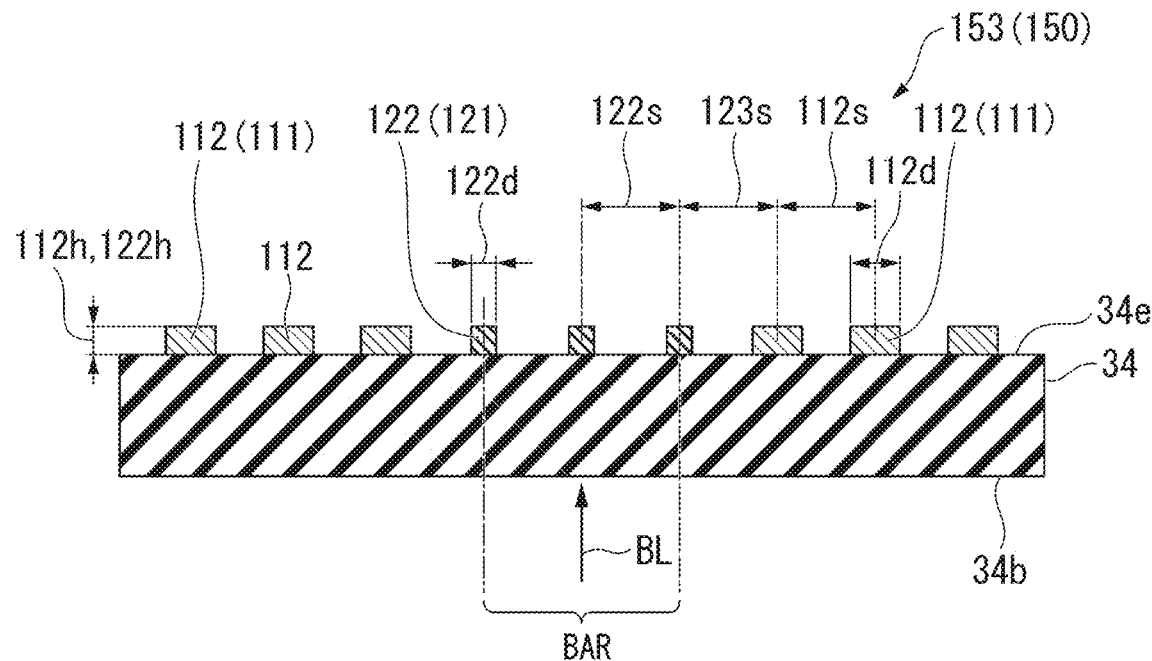
FIG. 21 is a cross-sectional view of a fluorescence emitting section in a ninth embodiment.

In the fluorescence emitting section 153 in the ninth embodiment, the greatest width 122$d$ of the second nanoantennas 122 can be different from the greatest width 112$d$ of the first nanoantennas 112 as shown in FIG. 21 in contrast to the configuration of the fluorescence emitting section 151 in the seventh embodiment. In FIG. 21, the greatest width 122$d$ of the second nanoantennas 122 is shorter than the greatest width 112$d$ of the first nanoantennas 112. As described in the third embodiment, since the nanoantenna pitch a is a factor for deciding the diffraction angle of the Rayleigh anomaly, it is assumed that the distances 112$s$, 122$s$, and 123$s$ of the first nanoantennas 112 and the second nanoantennas 122 are the same as each other. On the other hand, it is preferable for the greatest widths 112$d$, 122$d$ and the heights 112$h$, 122$h$ of the first nanoantennas 112 and the second nanoantennas 122 to appropriately be determined in accordance with the condition of the resonance of every nanoantenna.

On the same grounds as the grounds described in the third embodiment, in the fluorescence emitting section 153, since the materials and the resonance phenomena different from each other are respectively used in the area (inside the irradiation area BAQ) where the Mie resonance is made to act as the principle and the area (outside the irradiation area BAQ) where the LSPR is made to act as the principle, the greatest width (the diameter) 112$d$ the most suitable for the first nanoantennas 112 and the greatest width (the diameter) 122$d$ the most suitable for the second nanoantennas 122 are different from each other. According to the fluorescence emitting section 153 in the ninth embodiment, in each of the first nanoantenna group 111 and the second nanoantenna group 121, by making the wavelength band to be the object of the control of the radiation angle and the resonant wavelength band coincide with each other, it is possible to realize the nanoantenna structure high in radiation light intensity.

Tenth Embodiment

Then, a tenth embodiment of the present disclosure will be described using FIG. 22.

Besides the fact that a fluorescence emitting section 154 subsequently described is provided instead of the fluorescence emitting section 151, a projector and an illumination device according to the tenth embodiment are provided with substantially the same configurations as those of the projector 1 and the illumination device 2B according to the seventh embodiment.

In the fluorescence emitting section 154 in the tenth embodiment, in contrast to the configuration of the fluorescence emitting section 151 in the seventh embodiment, a third nanoantenna group 125 is disposed on the surface 34$b$ of the phosphor 34. When making the excitation light BL having high power enter the phosphor 34 in a state in which the energy density is high, the temperature of the phosphor 34 rises. It has been known that the rise in temperature of the phosphor 34 incurs the deterioration of the wavelength conversion efficiency of the phosphor 34. Therefore, by preventing the energy of the excitation light BL from excessively concentrating, it is possible to suppress the deterioration of the conversion efficiency of the phosphor 34 due to the rise in temperature.

The third nanoantenna group 125 has a plurality of third nanoantennas 126. The plurality of third nanoantennas 126 is arranged at predetermined distances from each other inside the irradiation area BAR with the excitation light BL on the surface 34$b$ of the phosphor 34. The third nanoantenna 126 which at least partially overlaps the irradiation area BAR is assumed to be arranged inside the irradiation area BAR. The excitation light $BL_S$ enters the irradiation area BAR shown in FIG. 22 from the first light collection optical system 26 shown in FIG. 2 in a converged state. The third nanoantenna group 125 is arranged in, for example, the irradiation area BAR in a substantially central part of the surface 34$b$ of the phosphor 34, and has contact with the dichroic film 52 shown in FIG. 18, and is arranged in the dichroic film 52 in a direction along the light axis AX2.

Figure 22:
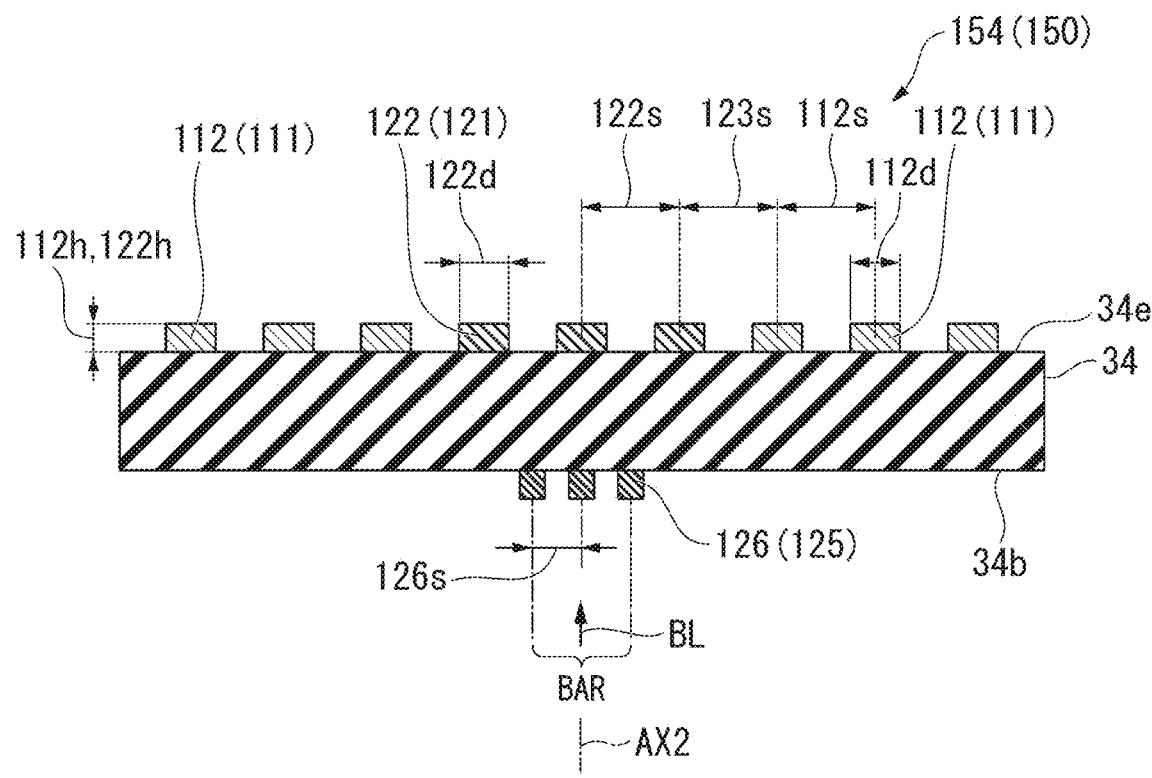
FIG. 22 is a cross-sectional view of a fluorescence emitting section in a tenth embodiment.

Each of the third nanoantennas 126 shown in FIG. 22 is formed to have, for example, a columnar shape, but is not limited to a circular shape, and can be formed to have a rectangular shape, a polygonal shape other than the rectangular shape, or a star shape. It should be noted that similarly to the reason described in the description of the nanoantennas 132, the shape of the bottom surface of each of the third nanoantennas 126 is preferably a shape having a high rotationally symmetric property with respect to the center, and is preferably, for example, a true-circular shape or a regular polygonal shape.

Distances 126$s$ between the centers of the third nanoantennas 126 adjacent to each other on the surface 34$b$ of the phosphor 34 are equal to each other. The third nanoantenna group 125 is a diffraction grating disposed for increasing the beam diameter of the excitation light BL entering the surface 34$b$ of the phosphor 34 as much as possible to decrease the energy density. Therefore, the distance 126$s$ between the third nanoantennas 126 is appropriately determined based on the formula of the diffraction grating in accordance with the wavelength (the peak wavelength or a representative wavelength) of the excitation light BL and an angle (a diffraction angle with respect to the light axis AX2) at which the excitation light BL is diffracted toward the phosphor 34.

It is preferable for the angle at which the excitation light BL is diffracted toward the phosphor 34 to be smaller than, for example, 45°. When the angle at which the excitation light BL is diffracted toward the phosphor 34 is excessively large, there is a possibility that the blur in a direction perpendicular to the light axis AX2 of the excitation light BL inside the phosphor 34 is significant, the beam size of the excitation light (transmitted light) B1 emitted from the phosphor 34 is enlarged, and the etendue of the illumination device 2B increases.

It is preferable for the material of the third nanoantennas 126 to be a dielectric material or a semiconductor material resistant to a rise in temperature from a viewpoint of suppressing the heat deterioration due to the rise in temperature when being irradiated with the excitation light BL having high power. As the dielectric material, there can be cited, for example, $TiO_2$, SiN, GaP, and $Al_2O_3$.

In the fluorescence emitting section 154 in the tenth embodiment, since the third nanoantenna group 125 is disposed in the irradiation area BAR on the surface 34b which the excitation light BL enters in the phosphor 34, it is possible to diffract the excitation light BL to reduce the energy of the excitation light BL which enters the phosphor 34. Therefore, according to the fluorescence emitting section 154 in the tenth embodiment, it is possible to reduce the energy density of the excitation light BL with the third nanoantenna group 125 disposed at the incident side in the phosphor 34 to thereby suppress the deterioration of the conversion efficiency of the phosphor 34 due to the rise in temperature, and thus, obtain high light use efficiency.

Eleventh Embodiment

Figure 23:
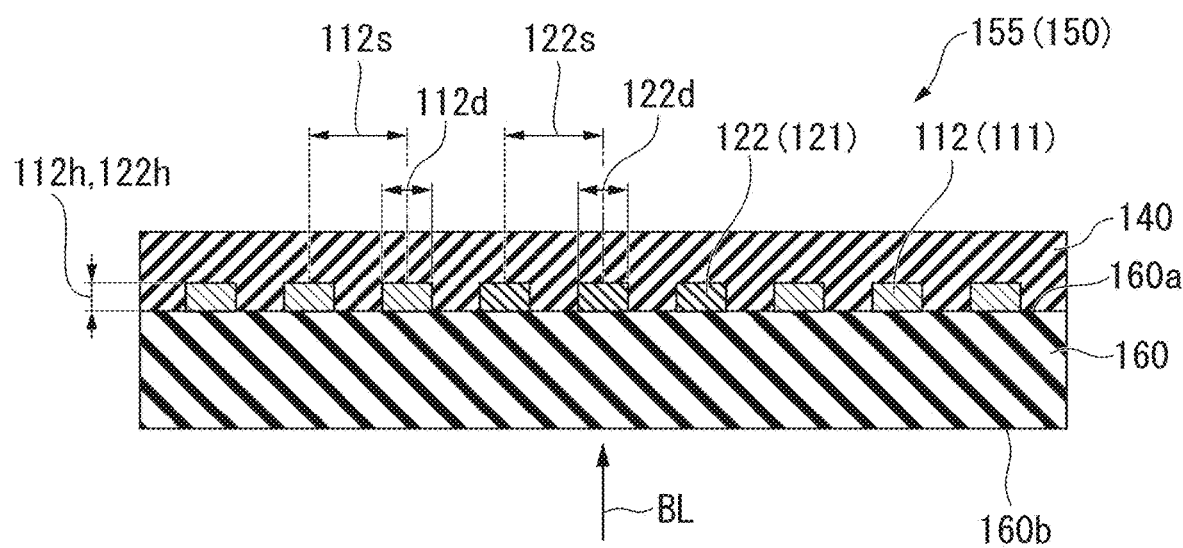
FIG. 23 is a cross-sectional view of a fluorescence emitting section in an eleventh embodiment.

Then, an eleventh embodiment of the present disclosure will be described using FIG. 23.

Besides the fact that a fluorescence emitting section 155 subsequently described is provided instead of the fluorescence emitting section 151, a projector and an illumination device according to the eleventh embodiment are provided with substantially the same configurations as those of the projector 1 and the illumination device 2B according to the seventh embodiment.

In the fluorescence emitting section 155 in the eleventh embodiment, the first nanoantenna group 111 and the second nanoantenna group 121 are arranged inside the phosphor layer (phosphor) 140 in contrast to the configuration of the fluorescence emitting section 151 in the seventh embodiment. As shown in FIG. 23, in the fluorescence emitting section 155, in the configuration of the fluorescence emitting section 151 in the seventh embodiment, the transparent substrate 160 is disposed instead of the phosphor 34, and the phosphor layer 140 is disposed so as to cover the surface 160a of the transparent substrate 160 exposed at the incident side of the excitation light BL, the first nanoantenna group 111, and the second nanoantenna group 121.

The first nanoantenna group 111 and the second nanoantenna group 121 are disposed on the surface 160a at the exit side of the excitation light B1 and the fluorescence YL in the transparent substrate 160. The dimensions such as the greatest width 112d and the height 112h of the first nanoantennas 112, the greatest width 122d and the height 122h of the second nanoantennas 122, the nanoantenna pitch a, and so on and the materials of the first nanoantennas 112 and the second nanoantennas 122 are assumed in substantially the same manner as the dimensions and the material of each of the first nanoantenna group 111 and the second nanoantenna group 121 of the fluorescence emitting section 151 in the seventh embodiment.

The suitable conditions and the materials of the phosphor layer 140 and the transparent substrate 160 of the fluorescence emitting section 155 can be considered in substantially the same manner as those of the phosphor layer 140 and the transparent substrate 160 of the fluorescence emitting section 104 in the fourth embodiment.

In the fluorescence emitting section 155 in the eleventh embodiment, it is possible to easily arrange the first nanoantenna group 111 and the second nanoantenna group 121 inside the phosphor layer 140 in the thickness direction using a method of applying a material such as a Lumogen F series colorant described above without using a material which bubbles enter when being formed as the phosphor. Further, according to the fluorescence emitting section 155 in the eleventh embodiment, similarly to the fluorescence emitting section 151 in the seventh embodiment, the material high in heat resistance such as the dielectric material as the material of the second nanoantennas 122 or the semiconductor is used in the irradiation area BAQ with the excitation light BL, and the metal is used as the material of the first nanoantennas 112 outside the irradiation area BAQ. As a result, it is possible to perform the efficient control of the radiation angle of the fluorescence YL to achieve both of the efficient extraction of the fluorescence YL from the phosphor layer 140, and the narrowing of the radiation angle and the increase in heat resistance.

Twelfth Embodiment

Figure 24:
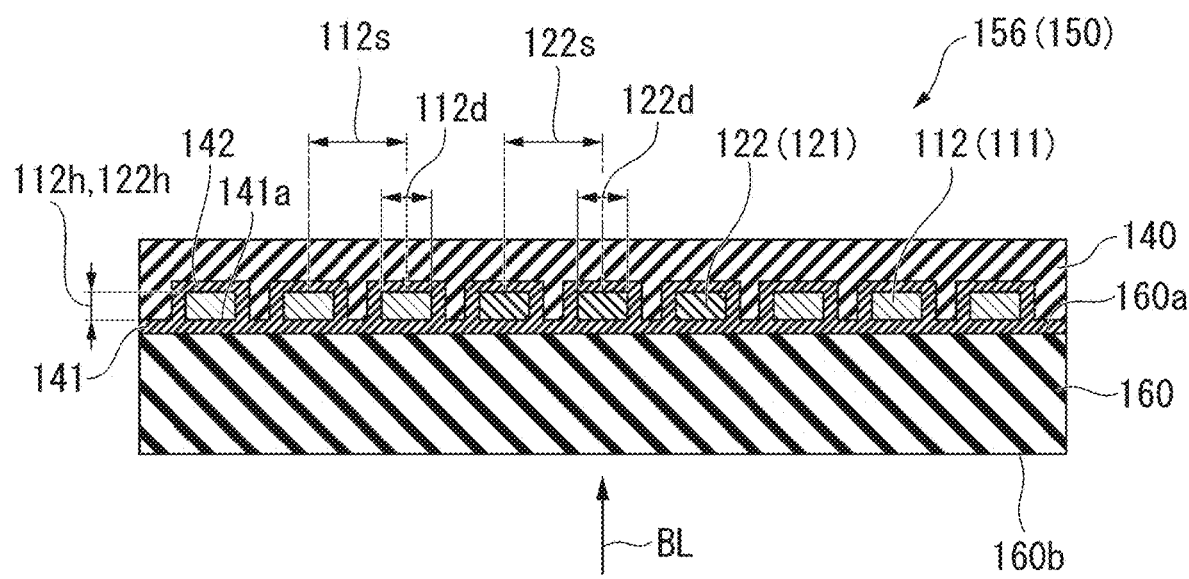
FIG. 24 is a cross-sectional view of a fluorescence emitting section in a twelfth embodiment.

Then, a twelfth embodiment of the present disclosure will be described using FIG. 24.

Besides the fact that a fluorescence emitting section 156 subsequently described is provided instead of the fluorescence emitting section 151, a projector and an illumination device according to the twelfth embodiment are provided with substantially the same configurations as those of the projector 1 and the illumination device 2B according to the seventh embodiment.

In the fluorescence emitting section 156 in the twelfth embodiment, the first nanoantenna group 111, the second nanoantenna group 121, the base layer 141, and the cover layer 142 are arranged inside the phosphor layer 140 in contrast to the configuration of the fluorescence emitting section 152 in the eighth embodiment. As shown in FIG. 24, in the fluorescence emitting section 156, in contrast to the configuration of the fluorescence emitting section 152 in the eighth embodiment, the transparent substrate 160 is disposed instead of the phosphor 34, and the phosphor layer 140 is disposed so as to cover the surface 141a of the base layer 141 exposed at the exit side of the excitation light BL and the cover layer 142.

Similarly to the fluorescence emitting section 102 in the second embodiment, in the fluorescence emitting section 156, by using the same material in the base layer 141 and the cover layer 142, the refractive index on the periphery of the first nanoantenna group 111 and the second nanoantenna group 121 is made substantially the same. According to such a fluorescence emitting section 156, there occurs more intensive SLR than in the fluorescence emitting section 155 in the tenth embodiment, and it is possible to increase the intensity of the light radiated from the fluorescence emitting section 156. Further, on the same grounds as the grounds described in the second embodiment, it is necessary for the relationship that the refractive index of the cover layer 142 is lower than the refractive index of the first nanoantennas 112 to be true.

Thirteenth Embodiment

Then, a thirteenth embodiment of the present disclosure will be described using FIG. 25.

Besides the fact that a fluorescence emitting section 157 subsequently described is provided instead of the fluorescence emitting section 151, a projector and an illumination device according to the thirteenth embodiment are provided with substantially the same configurations as those of the projector 1 and the illumination device 2B according to the seventh embodiment.

Figure 25:
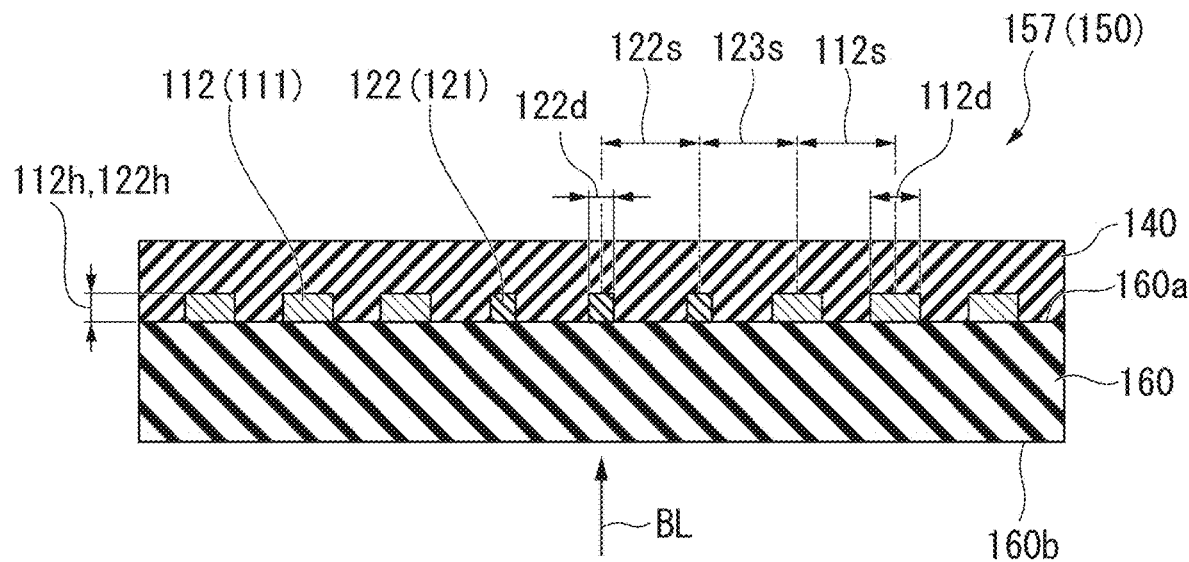
FIG. 25 is a cross-sectional view of a fluorescence emitting section in a thirteenth embodiment.

In the fluorescence emitting section 157 in the thirteenth embodiment, the first nanoantenna group 111 and the second nanoantenna group 121 are arranged inside the phosphor layer 140 as shown in FIG. 25 in contrast to the configuration of the fluorescence emitting section 153 in the ninth embodiment. In the fluorescence emitting section 157, the greatest width 122d of the second nanoantennas 122 can be different from the greatest width 112d of the first nanoantennas 112 as shown in FIG. 25 in contrast to the configuration of the fluorescence emitting section 155 in the eleventh embodiment. In FIG. 25, there is shown an example in which the greatest width 122d of the second nanoantennas 122 is shorter than the greatest width 112d of the first nanoantennas 112. The method of deciding the suitable dimensions related to the first nanoantennas 112 and the second nanoantennas 122 is as described in the third embodiment and the sixth embodiment.

On the same grounds as the grounds described in the third embodiment, in the fluorescence emitting section 157 in the thirteenth embodiment, the materials and the resonance phenomena different from each other are respectively used in the area (mainly inside the irradiation area BAR) where the Mie resonance is made to act as the principle and the area (mainly outside the irradiation area BAR) where the LSPR is made to act as the principle. In each of the first nanoantenna group 111 and the second nanoantenna group 121, by making the wavelength band to be the object of the control of the radiation angle and the resonant wavelength band coincide with each other, it is possible to realize the nanoantenna structure high in radiation angle intensity with the fluorescence emitting section 157.

Fourteenth Embodiment

Figure 26:
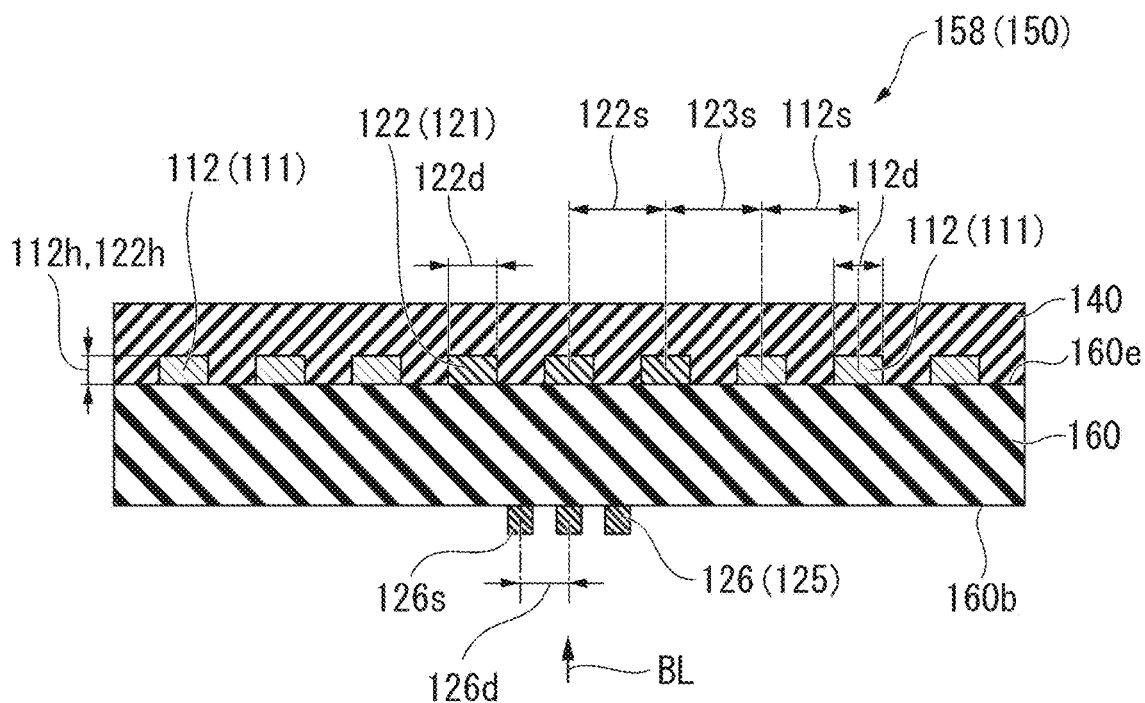
FIG. 26 is a cross-sectional view of a fluorescence emitting section in a fourteenth embodiment.

Then, a fourteenth embodiment of the present disclosure will be described using FIG. 26.

Besides the fact that a fluorescence emitting section 158 subsequently described is provided instead of the fluorescence emitting section 151, a projector and an illumination device according to the fourteenth embodiment are provided with substantially the same configurations as those of the projector 1 and the illumination device 2B according to the seventh embodiment.

In the fluorescence emitting section 158 in the fourteenth embodiment, in the configuration of the fluorescence emitting section 155 in the eleventh embodiment, the third nanoantenna group 125 is disposed in the irradiation area BAR on the surface 34b of the phosphor 34.

In the fluorescence emitting section 158 in the fourteenth embodiment, since the third nanoantenna group 125 is disposed in the irradiation area BAR on the surface 34b which the excitation light BL enters in the phosphor 34, it is possible to diffract the excitation light BL with the third nanoantenna group 125 to reduce the energy of the excitation light BL which enters the phosphor 34. According to the fluorescence emitting section 158 in the fourteenth embodiment, it is possible to reduce the energy density of the excitation light BL with the third nanoantenna group 125 to thereby suppress the deterioration of the conversion efficiency of the phosphor 34 due to the rise in temperature, and thus, obtain the high light use efficiency.

Fifteenth Embodiment

Figure 27:
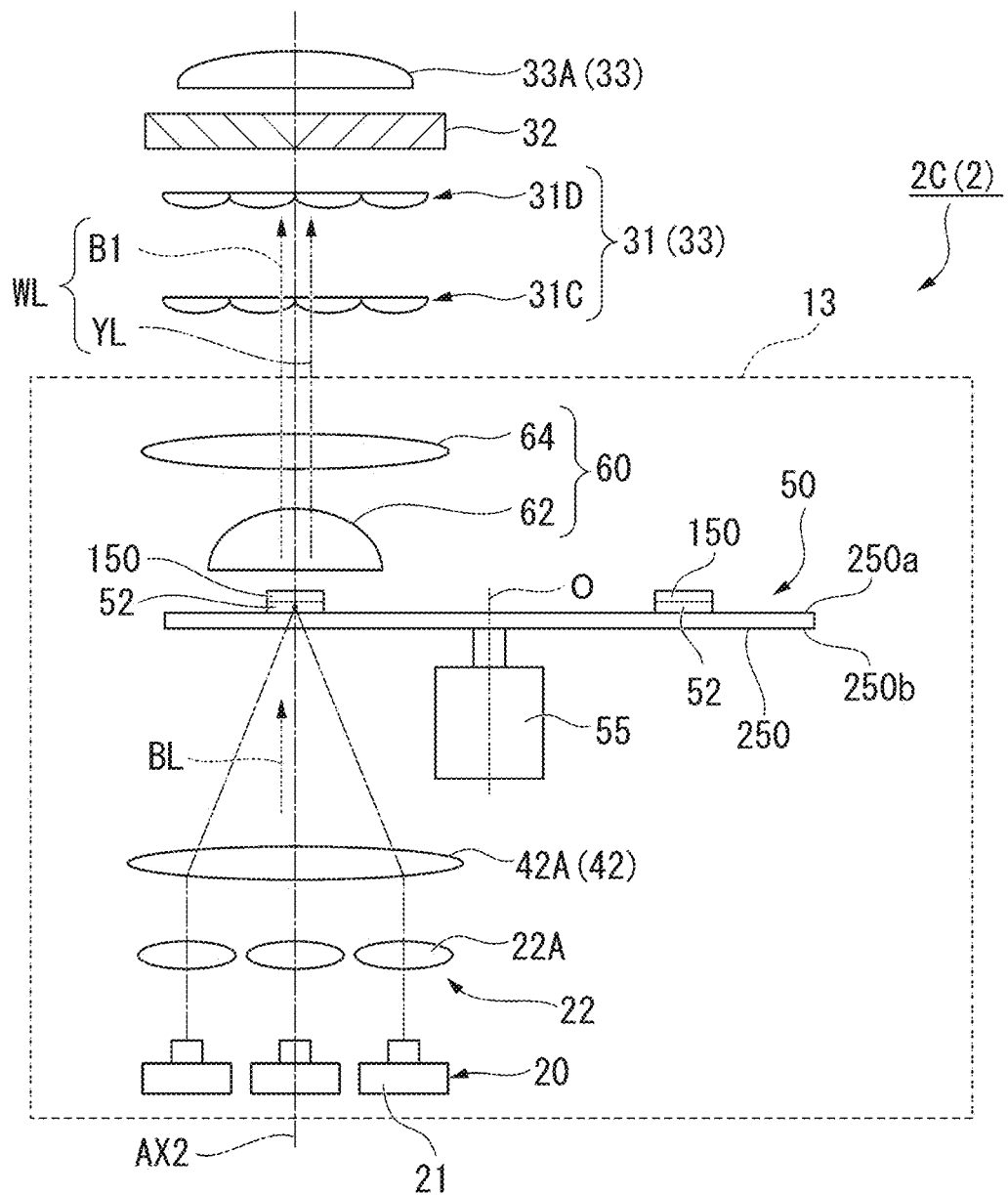
FIG. 27 is a schematic configuration diagram of an illumination device provided to a projector according to a fifteenth embodiment.

Then, a fifteenth embodiment of the present disclosure will be described using FIG. 27 and FIG. 28.

Besides the fact that an illumination device 2C subsequently described is provided instead of the illumination device 2A, a projector according to the fifteenth embodiment is provided with substantially the same configuration as that of the projector 1 according to the first embodiment.
Illumination Device The illumination device 2 according to the fifteenth embodiment is the illumination device 2C provided with a light source device 13. As shown in FIG. 27, the illumination device 2C is provided with the light source device 13, the integrator optical system 31, the polarization conversion element 32, and the superimposing lens 33A.

Figure 18:
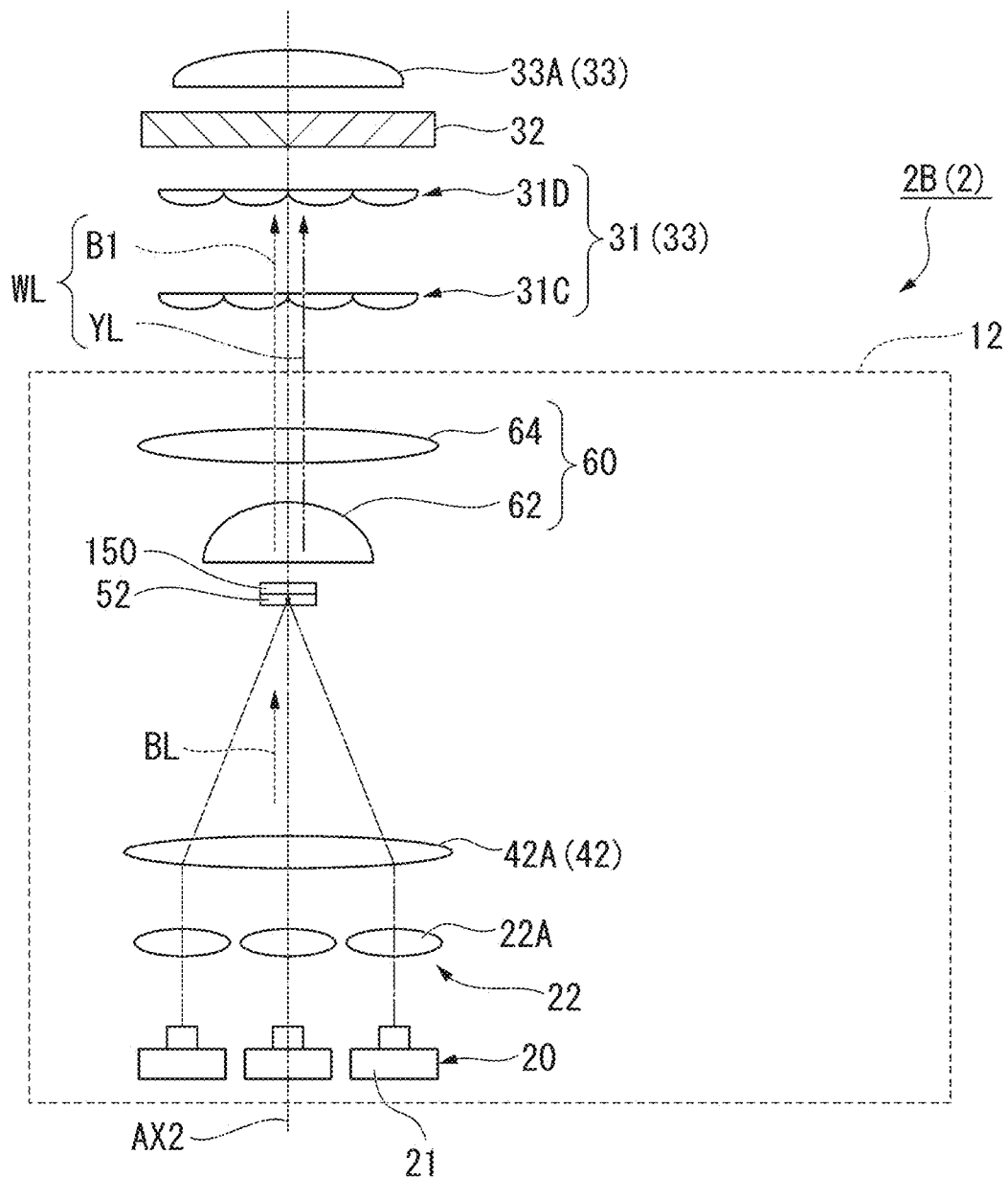
FIG. 18 is a schematic configuration diagram of an illumination device provided to a projector according to a seventh embodiment.
Figure 19:
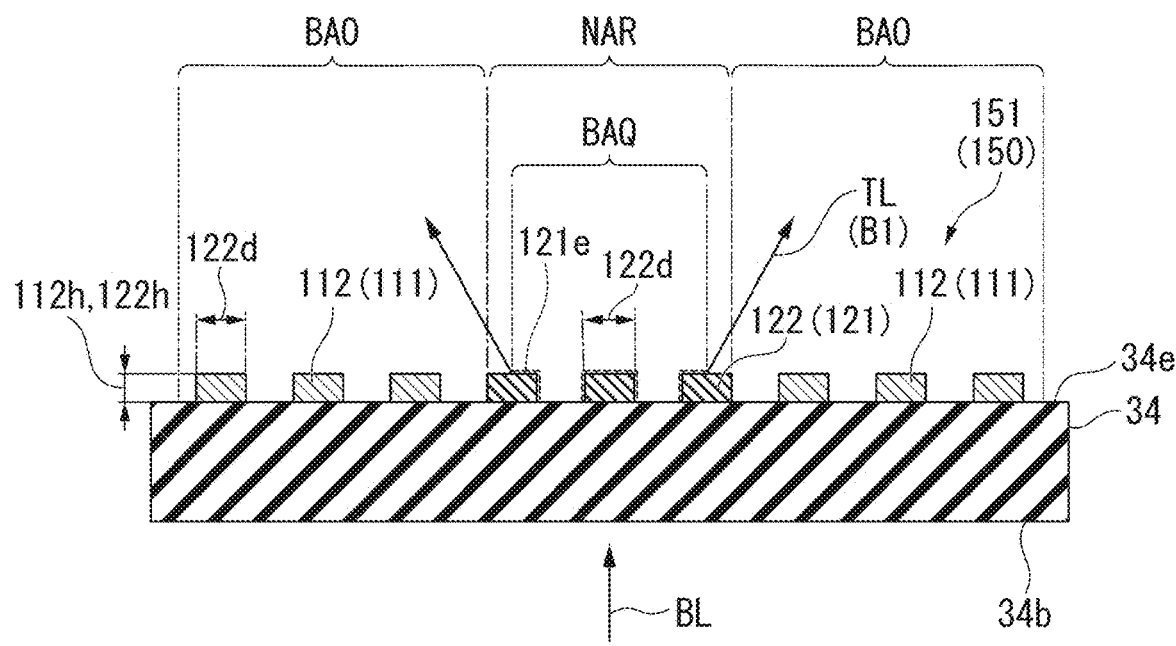
FIG. 19 is a cross-sectional view of a fluorescence emitting section in a seventh embodiment.

The light source device 13 is provided with a phosphor wheel 50 in addition to the array light source 20, the collimator optical system 22, the light collection optical system 23, and the pickup optical system 60 substantially the same as those of the illumination device 2B shown in FIG. 18. The array light source 20, the collimator optical system 22, the light collection optical system 23, the dichroic film 52, the phosphor wheel 50 of a transmissive type, and the pickup optical system 60 are arranged side by side in this order on the light axis AX2. It should be noted that a rotational axis O of the phosphor wheel 50 and the light axis AX2 are shifted from each other in a direction perpendicular to the light axis AX2. In a direction along the light axis AX2, the phosphor wheel 50 is disposed between the light collection optical system 42 and the pickup optical system 60.

In the light source device 13, the light collection optical system 42 converges the excitation light BL which has been converted by the collimator optical system 22 into parallel light on the fluorescence emitting section 150 disposed on the phosphor wheel 50. The phosphor wheel 50 is provided with a rotary substrate 250, the fluorescence emitting section 150, the dichroic film 52, and a motor 55. The rotary substrate 250 is formed of, for example, glass or resin having a transmissive property with respect to at least the excitation light BL and the fluorescence YL.

The rotary substrate 250 is formed to have a circular shape when viewed from a direction of the rotational axis O, but is not limited to the circular shape, and can be formed to have, for example, a polygonal shape. The motor 55 rotates the rotary substrate 250 around the predetermined rotational axis O. The rotary substrate 250 rotates in a plane substantially perpendicular to the light axis AX2 of the excitation light BL entering the rotary substrate 250.

The dichroic film 52 and the fluorescence emitting section 150 are disposed in sequence on a surface 250a at an opposite side to a side which the excitation light BL enters in the rotary substrate 250. As the fluorescence emitting section 150, it is possible to apply any one of the fluorescence emitting section 151 in the seventh embodiment through the fluorescence emitting section 158 in the fourteenth embodiment described above. In other words, the dichroic film 52 is disposed between the surface 34b of the phosphor 34 or the surface 160b of the transparent substrate 160 of the fluorescence emitting section 150 and the surface 250a of the rotary substrate 250.

An incident area of the excitation light BL to the rotary substrate 250 spreads throughout the entire area in the circumferential direction centering on the rotational axis O in a predetermined area between the center and the outer circumferential edge in the radial direction from the center of the rotary substrate 250, namely the rotational axis O. In other words, in the plan view from a direction along the rotational axis O, the incident area of the excitation light BL is annularly distributed having a predetermined width as shown in FIG. 28. In the fifteenth embodiment, the second nanoantenna group 121 is formed in the entire area in the circumferential direction centering on the rotational axis O in the area corresponding to the irradiation area BAQ with the excitation light B1 in the radial direction from the rotational axis O of the surface 250a of the rotary substrate 250. On the surface 250a, the first nanoantenna group 111 is formed in the entire area in the circumferential direction centering on the rotational axis O in the area which is a larger area than the irradiation area BAQ in the radial direction centering on the rotational axis O, and which corresponds to an irradiation area BAO with the fluorescence YL.

Figure 28:
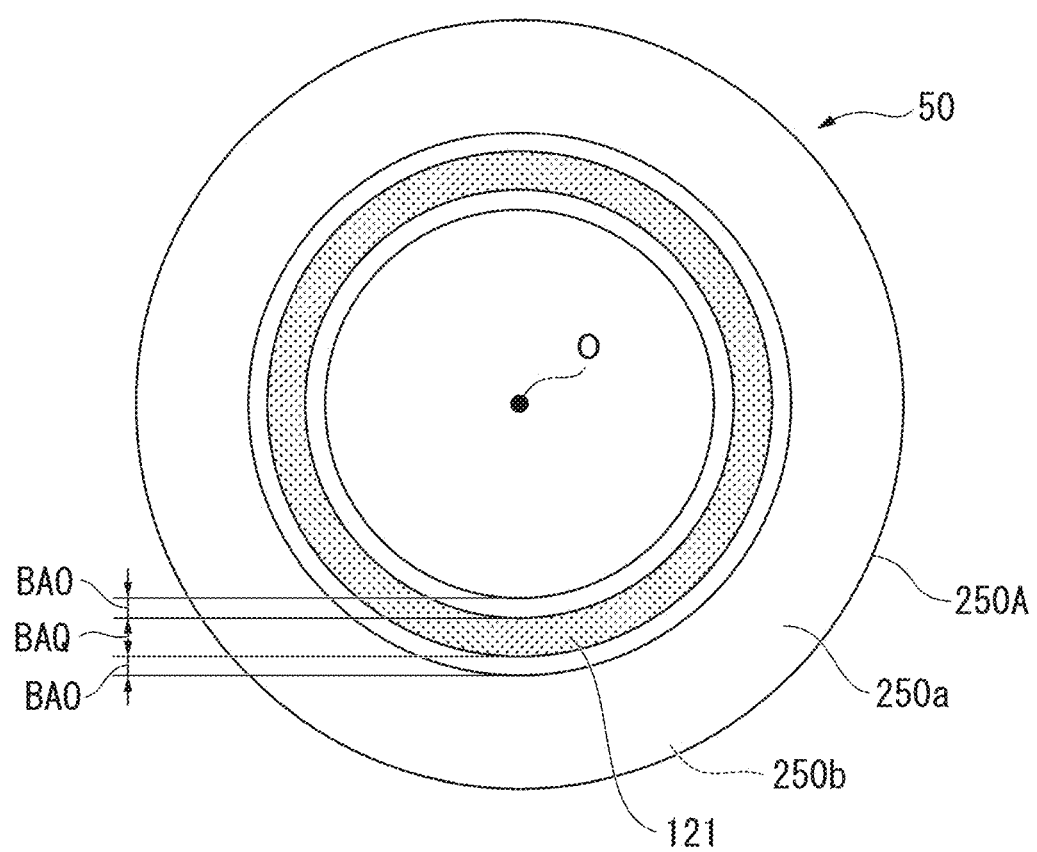
FIG. 28 is a plan view of a phosphor wheel of the illumination device shown in FIG. 27 viewed from a direction along an optical axis AX2.

When any one of the fluorescence emitting section 155 in the eleventh embodiment through the fluorescence emitting section 158 in the fourteenth embodiment is arranged as the fluorescence emitting section 150 of the phosphor wheel 50 shown in FIG. 28, the rotary substrate 250 can be applied as the transparent substrate 160. Further, when the fluorescence emitting section 158 in the fourteenth embodiment is arranged as the fluorescence emitting section 150 of the phosphor wheel 50, the third nanoantenna group 125 can be formed in the area (not shown) which corresponds to the irradiation area BAR with the excitation light BL smaller than the irradiation area BAQ in the radial direction centering on the rotational axis O and at the same time the entire area in the circumferential direction centering on the rotational axis O on the surface 250b at the side which the excitation light BL enters in the rotary substrate 250.

According to the fluorescence emitting section 150 in the fifteenth embodiment, out of an antenna area having an annular planar shape on the surface 250a of the rotary substrate 250, the material such as a dielectric material higher in heat resistance than the metal is used inside the irradiation area BAQ located in the vicinity of the central position which the excitation light BL enters in the radial direction, the metal is used in the irradiation area BAO at the outer side in the radial direction from the irradiation area BAQ, and the efficient control of the radiation angle can be achieved due to the first nanoantenna group 111 and the second nanoantenna group 121. Further, in the fluorescence emitting section 150 and the illumination device 2C in the fifteenth embodiment, by providing a rotary mechanism such as the motor 55 to the phosphor wheel 50, it is possible to suppress the energy concentration of the excitation light BL to the phosphor 34 to achieve the increase in efficiency as the light source.

Some preferred embodiments of the present disclosure are hereinabove described in detail, but the present disclosure is not limited to such specific embodiments, and there can be adopted a variety of deformations and modifications within the scope and the spirit of the present disclosure set forth in the appended claims. Further, the constituents of the plurality of embodiments can arbitrarily be combined with each other.

For example, in the fluorescence emitting sections in the embodiments described above, it is assumed that the refractive index on the periphery of each of the first nanoantenna group 111 and the second nanoantenna group 121 is uniform. However, when the refractive index on the periphery of each of the first nanoantenna group 111 and the second nanoantenna group 121 varies locally or continuously, the distances 112s between the first nanoantennas 112 of the first nanoantenna group 111, the distances 122s between the second nanoantennas 122 of the second nanoantenna group 121, and the distances 123s between the first nanoantennas 112 and the second nanoantennas 122 adjacent to each other can be different from each other in accordance with the variation in the refractive index. Further, each of the distances 112s, 122s, and 123s is not required to necessarily be constant, and can appropriately be set in accordance with the refractive index on the periphery of each of the first nanoantenna group 111 and the second nanoantenna group 121.

For example, in the fluorescence emitting section provided with the base layer 141 and the cover layer 142, when the refractive index of the cover layer 142 covering the first nanoantennas 112 and the refractive index of the cover layer 142 covering the second nanoantennas 122 are different from each other, it is possible to make the distance 112s between the first nanoantennas 112 and the distance 122s between the second nanoantennas 122 different from each other in accordance with the difference in refractive index of the cover layer 142.

In the embodiments described above, there is illustrated the semiconductor material or the dielectric material having a higher melting point than the metal and so on as the material of the second nanoantennas 122, but it is sufficient for the material of the second nanoantennas 122 to have a higher melting point than at least that of the first nanoantennas 112, and it is possible to adopt the metal having sufficiently higher melting point than that of the metal material of the first nanoantennas 112, or an arbitrary material other than the semiconductor material or the dielectric material.

Although in each of the embodiments, there is described the example of installing the light source device according to the present disclosure in the projector, this is not a limitation. The light source device according to the present disclosure can also be applied to lighting equipment, a headlight of a vehicle, a head-mounted display, and so on.

A light source device according to an aspect of the present disclosure may have the following configuration.

The light source device according to the aspect of the present disclosure includes a light source configured to emit excitation light, a phosphor which the excitation light enters, and which is configured to emit fluorescence different in wavelength from the excitation light, a first nanoantenna group which is provided to the phosphor, and has a plurality of first nanoantennas, and a second nanoantenna group which is provided to the phosphor, and has a plurality of second nanoantennas, wherein each of the first nanoantennas is formed of metal, each of the second nanoantennas is formed of a material higher in melting point than the metal, an arrangement area of the second nanoantenna group overlaps an irradiation area with the excitation light in a plan view viewed from a normal direction of the phosphor, and an electric field enhancement of the fluorescence is achieved by each of the first nanoantennas and each of the second nanoantennas.

In the light source device according to the aspect of the present disclosure, there may be adopted a configuration in which the arrangement area of the second nanoantenna group is included in an area of a half-value width of power of the excitation light (or transmitted light transmitted through the phosphor excited by the excitation light).

In the light source device according to the aspect of the present disclosure, there may be adopted a configuration in which the arrangement area of the second nanoantenna group is included in an area of a ($1/e^2$)-value width of power of the excitation light (or transmitted light transmitted through the phosphor excited by the excitation light).

In the light source device according to the aspect of the present disclosure, there may be adopted a configuration in which a base layer or a cover layer is disposed on a periphery of each of the first nanoantennas and a periphery of each of the second nanoantennas, the base layer and the cover layer are lower in refractive index than the second nanoantennas, and a distance between the first nanoantennas and a distance between the second nanoantennas are determined so as to fulfill a Rayleigh anomaly condition in each of the first nanoantenna group and the second nanoantenna group.

In the light source device according to the aspect of the present disclosure, the base layer and the cover layer may be equal in refractive index to each other, and the distance between the first nanoantennas and the distance between the second nanoantennas may be equal to each other.

In the light source device according to the aspect of the present disclosure, there may be adopted a configuration in which a greatest width in the plan view of the plurality of first nanoantennas is determined in accordance with a condition in which localized surface plasmon resonance occurs in the first nanoantenna group, and a greatest width in the plan view of the plurality of second nanoantennas is determined in accordance with a condition in which Mie resonance occurs in the second nanoantenna group.

In the light source device according to the aspect of the present disclosure, there may be adopted a configuration in which there is further included a transparent substrate transparent with respect to the excitation light and the fluorescence, wherein the phosphor, the first nanoantenna group, and the second nanoantenna group are provided to the transparent substrate, and the first nanoantenna group, and the second nanoantenna group are arranged inside the phosphor.

In the light source device according to the aspect of the present disclosure, there may be adopted a configuration in which there is further included a third nanoantenna group disposed at an opposite side to a side where the first nanoantenna group and the second nanoantenna group are arranged in a thickness direction of the transparent substrate, wherein the third nanoantenna group has a plurality of third nanoantennas, and the excitation light is diffracted by the third nanoantenna group.

A projector according to an aspect of the present disclosure may have the following configuration.

The projector according to the aspect of the present disclosure includes the light source device according to one of the above aspects of the present disclosure, a light modulation device configured to modulate light from the light source device in accordance with image information, and a projection optical device configured to project the light modulated by the light modulation device.

A display device according to an aspect of the present disclosure may have the following configuration.

The display device according to the aspect of the present disclosure includes the light source device according to one of the above aspects of the present disclosure.

What is claimed is:

1. A light source device comprising:
a light source configured to emit excitation light;
a phosphor which the excitation light enters, the phosphor being configured to emit fluorescence different in wavelength from the excitation light, the phosphor comprising a first surface;
a plurality of nanoantennas provided to the phosphor, the plurality of nanoantennas comprising a first nanoantenna group and a second nanoantenna group, the first nanoantenna group comprising each of the plurality of nanoantennas formed of a first material, the second nanoantenna group comprising each of the plurality of nanoantennas formed of a second material that is different from the first material;
each nanoantenna of the first nanoantenna group being disposed at a first location on the first surface; and
each nanoantenna of the second nanoantenna group being disposed at a second location on the first surface, the second location being different from the first location, wherein
the first nanoantenna group is disposed around the second nanoantenna group such that the first nanoantenna group surrounds the second nanoantenna group,
the first material comprises metal,
the second material has a greater melting point than the first material,
an arrangement area of the second nanoantenna group overlaps an irradiation area with the excitation light in a plan view,
an arrangement area of the first nanoantenna group is outside the irradiation area with the excitation light in a plan view,
nanoantennae of the second nanoantenna group positioned to a center of the arrangement area of the second nanoantenna group are adjacent to other second nanoantennae,
nanoantennae of the second nanoantenna group positioned to an outer periphery of the arrangement area of the second nanoantenna group are adjacent to both the other second nanoantenna and first nanoantennae, and
an electric field enhancement of the fluorescence is achieved by each nanoantenna of the first nanoantenna group and each nanoantenna of the second nanoantenna group.

2. The light source device according to claim 1, wherein the first nanoantenna group is arranged at an outer side of the second nanoantenna group in the plan view.

3. The light source device according to claim 1, wherein a distance between the nanoantennas of the first nanoantenna group and a distance between the nanoantennas of the second nanoantenna group are equal to each other.

4. The light source device according to claim 1, wherein the arrangement area of the second nanoantenna group is included in an area of a half-value width of power of the excitation light.

5. The light source device according to claim 1, wherein the arrangement area of the second nanoantenna group is included in an area of a $1/e^2$-value width of power of the excitation light.

6. The light source device according to claim 1, wherein
a width in the plan view of the first nanoantenna group is determined in accordance with a condition in which localized surface plasmon resonance occurs in the first nanoantenna group, and
a width in the plan view of the second nanoantenna group is determined in accordance with a condition in which Mie resonance occurs in the second nanoantenna group.

7. The light source device according to claim 1, wherein the second material of each of the nanoantennas of the second nanoantenna group is one of a dielectric material, a semiconductor material, and an insulating material.

8. The light source device according to claim 1, wherein the first material of each of the nanoantennas of the first nanoantenna group is one of silver, aluminum, and gold.

9. The light source device according to claim 1, further comprising:
a first layer disposed on a periphery of each of the nanoantennas of the first nanoantenna group and a periphery of each of the nanoantennas of the second nanoantenna group, wherein
the first layer is lower in refractive index than the nanoantennas of the second nanoantenna group, and
a distance between the nanoantennas of the first nanoantenna group and a distance between the nanoantennas of the second nanoantenna group each fulfill a Rayleigh anomaly condition.

10. The light source device according to claim 1, wherein a width of the nanoantennas of the second nanoantenna group along an arrangement direction of the second nanoantenna group is smaller than a width of the nanoantennas of the first nanoantenna group along an arrangement direction of the first nanoantenna group.

11. The light source device according to claim 1, further comprising:
a transparent substrate transparent with respect to the excitation light and the fluorescence, wherein
the phosphor, the first nanoantenna group, and the second nanoantenna group are disposed on a surface of the transparent substrate, and
the first nanoantenna group and the second nanoantenna group are disposed inside the phosphor.

12. The light source device according to claim 1, further comprising:
a reflecting layer configured to reflect the fluorescence, wherein
the phosphor has a second surface, the first surface and the second surface being opposed to each other,
the excitation light enters the first surface,
the first nanoantenna group and the second nanoantenna group are arranged at a first surface side, and
the reflecting layer is disposed at a second surface side.

13. The light source device according to claim 1, further comprising:
a first film configured to transmit the excitation light and reflect the fluorescence, wherein
the phosphor has a second surface, the first surface and the second surface being opposed to each other,
the excitation light enters the second surface,
the first nanoantenna group and the second nanoantenna group are arranged at a first surface side, and
the first film is disposed at a second surface side.

14. The light source device according to claim 13, further comprising:

a third nanoantenna group provided to the phosphor, the third nanoantenna group comprising each of the plurality of nanoantennas formed of a third material, wherein
the third nanoantenna group is disposed at the second surface side, and
the excitation light is diffracted by the third nanoantenna group.

15. The light source device according to claim 14, wherein
the third nanoantenna group is arranged inside the first film.

16. The light source device according to claim 14, wherein
the third nanoantenna group is arranged at a position at the second surface side, the position corresponding to the second nanoantenna group.

17. The light source device according to claim 14, wherein
the third material is one of a dielectric material and a semiconductor material.

18. The light source device according to claim 14, wherein
a width of the nanoantennas of the third nanoantenna group along an arrangement direction of the third nanoantenna group is smaller than a width of the nanoantennas of the second nanoantenna group along an arrangement direction of the second nanoantenna group.

19. A projector comprising:
the light source device according to claim 1;
a light modulation device configured to modulate light emitted from the light source device; and
a projection optical device configured to project the light modulated by the light modulation device.

20. A light source device comprising:
a light source configured to emit excitation light;
a phosphor which the excitation light enters, the phosphor comprising an exit surface, the phosphor being configured to emit fluorescence different in wavelength from the excitation light;
a plurality of nanoantennas provided to the phosphor, the plurality of nanoantennas comprising a first nanoantenna group and a second nanoantenna group, the first nanoantenna group comprising each of the plurality of nanoantennas formed of a first material, the second nanoantenna group comprising each of the plurality of nanoantennas formed of a second material that is different from the first material;
each nanoantenna of the first nanoantenna group arranged outside an irradiation area; and
at least a portion of the second nanoantenna group arranged inside the irradiation area, wherein
the first nanoantenna group is disposed around the second nanoantenna group such that the first nanoantenna group surrounds the second nanoantenna group,
the first material is metal,
the second material is a material higher in melting point than the metal,
an arrangement area of the second nanoantenna group overlaps the irradiation area with the excitation light in a plan view viewed from a normal direction of the phosphor,
an arrangement area of the first nanoantenna group is outside the irradiation area with the excitation light in a plan view, nanoantennae of the second nanoantenna group positioned to a center of the arrangement area of the second nanoantenna group are adjacent to other second nanoantennae, nanoantennae of the second nanoantenna group positioned to an outer periphery of the arrangement area of the second nanoantenna group are adjacent to both the other second nanoantenna and first nanoantennae, an electric field enhancement of the fluorescence is achieved by each nanoantenna of the first nanoantenna group and each nanoantenna of the second nanoantenna group, and a central portion of the exit surface defines the irradiation area.

21. A light source device comprising:

a light source configured to emit excitation light;

a phosphor which the excitation light enters, the phosphor being configured to emit fluorescence different in wavelength from the excitation light, the phosphor comprising an exit surface;

a plurality of nanoantennas provided to the phosphor, the plurality of nanoantennas comprising a first nanoantenna group and a second nanoantenna group, the first nanoantenna group comprising each of the plurality of nanoantennas formed of a first material, the second nanoantenna group comprising each of the plurality of nanoantennas formed of a second material that is different from the first material;

each nanoantenna of the first nanoantenna group being disposed on the exit surface at a first location; and each nanoantenna of the second nanoantenna group being disposed on the exit surface at a second location, the second location being different from the first location, wherein the first material comprises metal, the second material has a greater melting point than the first material, an arrangement area of the second nanoantenna group overlaps an irradiation area with the excitation light in a plan view viewed from a normal direction of the phosphor, an arrangement area of the first nanoantenna group is outside the irradiation area with the excitation light in a plan view, nanoantennae of the second nanoantenna group positioned to a center of the arrangement area of the second nanoantenna group are adjacent to other second nanoantennae, nanoantennae of the second nanoantenna group positioned to an outer periphery of the arrangement area of the second nanoantenna group are adjacent to both the other second nanoantenna and first nanoantennae, and an electric field enhancement of the fluorescence is achieved by each nanoantenna of the first nanoantenna group and each nanoantenna of the second nanoantenna group.

* * * * *